(12) United States Patent
Olsson

(10) Patent No.: US 11,717,082 B2
(45) Date of Patent: Aug. 8, 2023

(54) CONVERTIBLE ITEM HAVING AN ANTI-TIP LEG SYSTEM

(71) Applicant: Ashley Norman Olsson, Darra (AU)

(72) Inventor: Ashley Norman Olsson, Darra (AU)

( * ) Notice: Subject to any disclaimer, the term of this patent is extended or adjusted under 35 U.S.C. 154(b) by 103 days.

(21) Appl. No.: 17/614,489

(22) PCT Filed: May 26, 2020

(86) PCT No.: PCT/AU2020/050520
§ 371 (c)(1),
(2) Date: Nov. 26, 2021

(87) PCT Pub. No.: WO2020/237298
PCT Pub. Date: Dec. 3, 2020

(65) Prior Publication Data
US 2022/0218105 A1    Jul. 14, 2022

(30) Foreign Application Priority Data

May 28, 2019  (AU) ................................. 2019901825
Jul. 25, 2019  (WO) ................ PCT/AU2019/050780

(51) Int. Cl.
*A47B 46/00*   (2006.01)
*A47B 97/00*   (2006.01)

(52) U.S. Cl.
CPC .............. *A47B 46/00* (2013.01); *A47B 97/00* (2013.01); *A47B 2097/008* (2013.01)

(58) Field of Classification Search
CPC .... A47B 1/00; A47B 1/03; A47B 1/08; A47B 21/02; A47B 21/03; A47B 43/00;
(Continued)

(56) References Cited

U.S. PATENT DOCUMENTS

| 49,677 A | * | 8/1865 | Cuttica | ..................... A47B 1/03 |
| | | | | 108/17 |
| 554,187 A | * | 2/1896 | Jameson | ................... A47B 1/03 |
| | | | | 108/17 |

(Continued)

FOREIGN PATENT DOCUMENTS

| CN | 108634642 A | * | 10/2018 | ............. A47B 31/04 |
| GB | 2246290 A | * | 1/1992 | ............. A47B 43/00 |

OTHER PUBLICATIONS

International Search Report and Written Opinion for PCT/AU2020/050520, dated Jul. 10, 2020, ISA Australian Patent Office, 8 pages.

*Primary Examiner* — Joshua E Rodden
(74) *Attorney, Agent, or Firm* — Klarquist Sparkman, LLP

(57) ABSTRACT

A convertible item of furniture including: a plurality of shelf units, wherein each shelf unit has a horizontally extending leave and at least one leave support for supporting the leave; a drive system operably connected to each leave support such that the leaves remain horizontal when the shelf units are moved between a vertical configuration and a horizontal configuration; and, an anti-tip leg system. The anti-tip leg system has a front leg assembly and a rear leg assembly including an upwardly extending pair of rear legs, each rear leg comprising a rear leg upper region operably connected to a shelf unit or a part of the drive system, and a rear leg lower region supporting at least one wheel, and a linkage assembly interconnecting the front and rear leg assemblies. A spacing between the front and rear leg lower regions increases as the shelf units move towards the horizontal configuration.

20 Claims, 17 Drawing Sheets

(58) Field of Classification Search
CPC ....... A47B 43/04; A47B 46/00; A47B 46/005; A47B 85/00; A47B 85/02; A47B 85/04; A47B 85/06; A47B 85/08; A47B 97/00; A47B 2001/035; A47B 2001/085; A47B 2097/008; A47F 5/12
USPC ........ 211/1.51, 85, 195, 198, 199, 200, 201, 211/202, 203, 204; 108/17, 94–96, 115
See application file for complete search history.

(56) References Cited

U.S. PATENT DOCUMENTS

| | | | | |
|---|---|---|---|---|
| 580,643 A * | 4/1897 | Halteman | ................ | A47B 1/03 108/17 |
| 582,350 A * | 5/1897 | Hall et al. | ................ | A47B 1/03 108/17 |
| 593,916 A * | 11/1897 | Yunck | ................ | A47B 1/03 108/17 |
| 603,715 A * | 5/1898 | Weston | ................ | A47B 1/03 108/17 |
| 626,513 A * | 6/1899 | Yarns | ................ | A47B 1/03 108/17 |
| 646,665 A * | 4/1900 | Jameson | ................ | A47B 1/03 108/17 |
| 1,743,972 A | 1/1930 | Krummes | | |
| 1,777,863 A * | 10/1930 | Seltzer | ................ | A47F 7/283 211/128.1 |
| 1,889,901 A * | 12/1932 | Millard | ................ | A47B 85/06 108/17 |
| 3,446,311 A * | 5/1969 | Alfie | ................ | E06C 1/387 182/116 |
| 3,827,376 A * | 8/1974 | Solomon | ................ | A47B 43/00 108/177 |
| 4,917,250 A * | 4/1990 | Barbieri | ................ | A47B 57/04 211/195 |
| 5,096,072 A * | 3/1992 | Link | ................ | A47F 5/13 211/195 |
| 5,590,796 A * | 1/1997 | Herman | ................ | A47F 5/16 211/150 |
| 5,730,068 A * | 3/1998 | Rioux, Jr. | ................ | A47F 5/10 108/92 |
| 2002/0023889 A1 * | 2/2002 | Larbaletier | ................ | A47F 5/12 108/92 |
| 2022/0151380 A1 * | 5/2022 | Zhu | ................ | A47B 85/06 |

\* cited by examiner

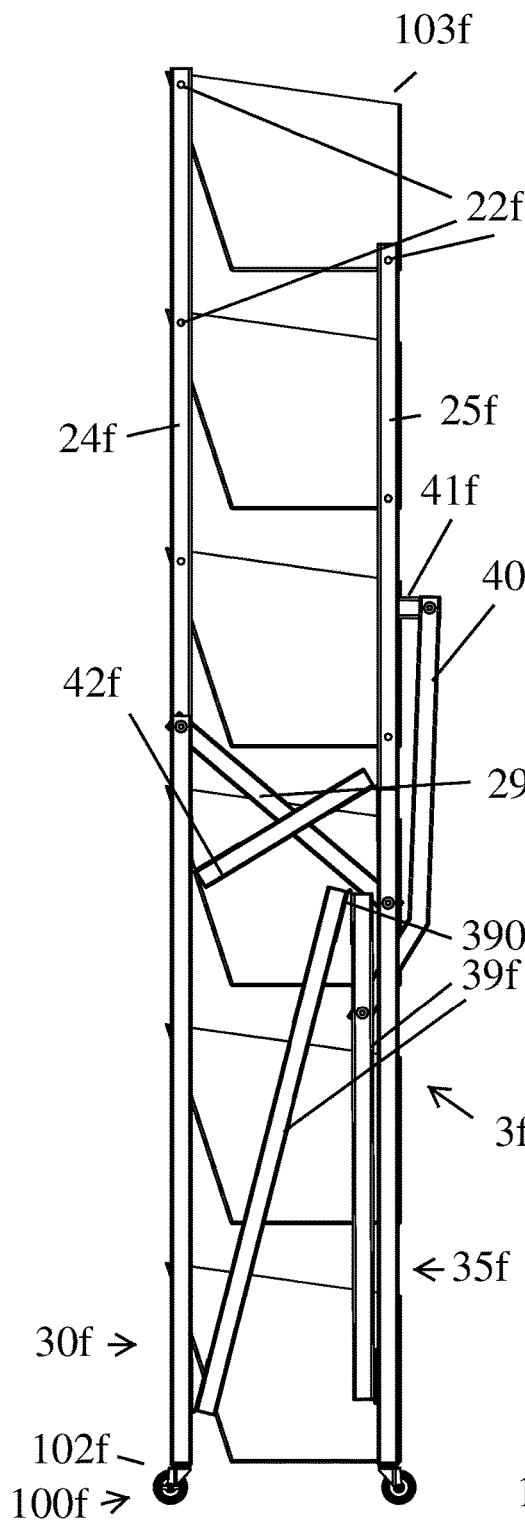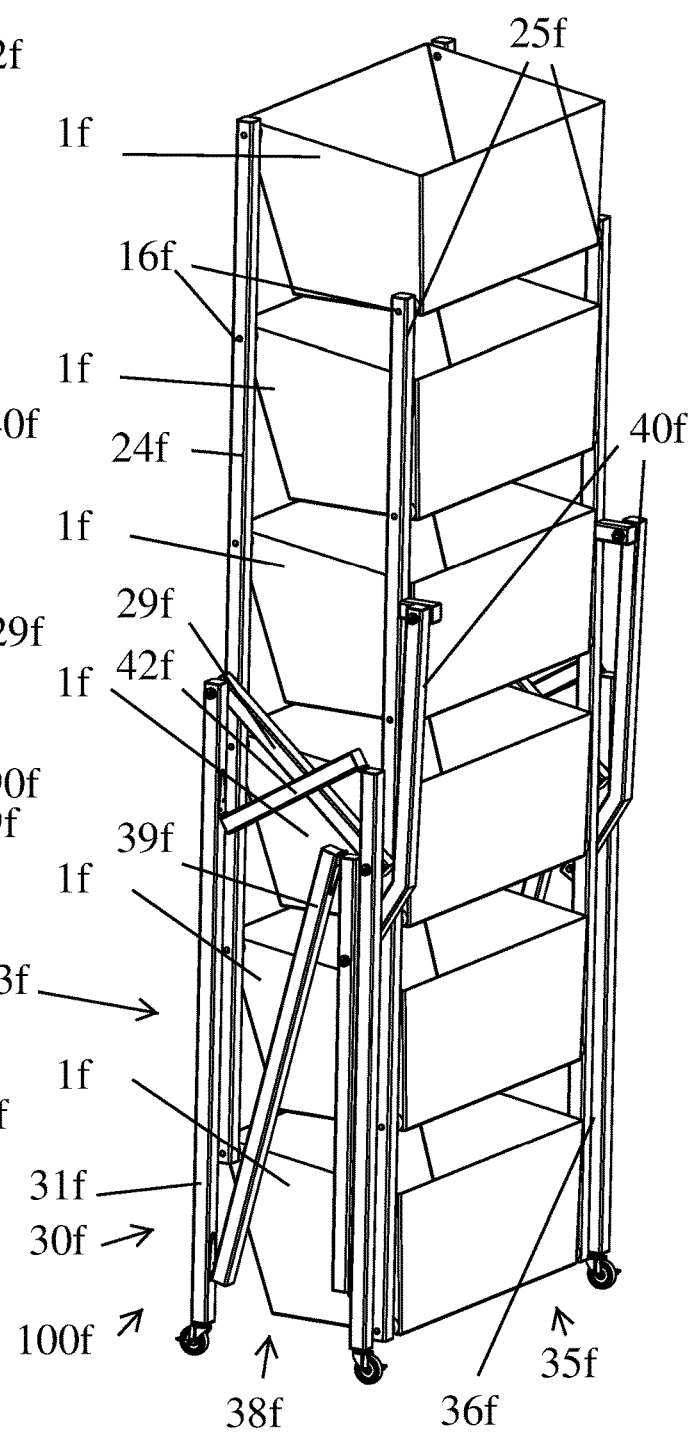
Figure 16
Figure 17

CONVERTIBLE ITEM HAVING AN ANTI-TIP LEG SYSTEM

RELATED APPLICATIONS

This is the U.S. National Stage of International Application No. PCT/AU2020/050520, filed May 26, 2020, which in turn claims priority of International Application No. PCT/AU2019/050780, filed Jul. 25, 2019, and Australian Provisional Application No. 2019901825, filed May 28, 2019, the entire contents of each of which are incorporated herein by way of reference.

TECHNICAL FIELD

The present invention relates to a convertible item (eg. furniture) having an anti-tip leg system for providing greater support and stability when reconfiguring the convertible item from a substantially horizontal shelf configuration to a substantially vertical shelf configuration, and vice-versa.

BACKGROUND ART

Convertible items of furniture, reconfigurable as shelves or tables, are known. Such items are described in the applicant's earlier patent applications, including PCT/AU2019/050780 and Australian patent application number 2019901825. A disadvantage of such convertible items, however, is that they may become unstable and tip when moved between vertical and horizontal configurations.

SUMMARY OF INVENTION

It is an object of one or more embodiments of the present invention to overcome the disadvantage described above, or to provide the public with a useful commercial choice.

According to an embodiment of the present invention, there is provided a convertible item, such as an item of furniture, comprising:
  a front end and a rear end;
  a plurality of shelf units, wherein each said shelf unit comprises a substantially horizontally extending leave and at least one leave support for supporting the leave;
  a drive system operably connected to each said leave support such that the leaves remain substantially horizontal when the shelf units are moved between (1) a substantially vertical shelf configuration whereby the leaves extend in spaced substantially horizontal parallel planes above one another, and (2) a substantially horizontal configuration whereby the leaves are positioned next to one another in a substantially horizontal plane between the front and rear ends; and
  an anti-tip leg system comprising:
  a front leg assembly comprising at least an upwardly extending pair of front legs spaced apart from one another, each said front leg comprising a front leg upper region operably connected directly or indirectly to a shelf unit or a part of the drive system and a front leg lower region supporting at least one wheel;
  a rear leg assembly comprising at least an upwardly extending pair of rear legs spaced apart from one another, each said rear leg comprising a rear leg upper region operably connected directly or indirectly to a said shelf unit or a part of the drive system, and a rear leg lower region supporting at least one wheel; and
  a linkage assembly interconnecting the front and rear leg assemblies,
wherein:
  a spacing between the front and rear leg lower regions increases as the shelf units move towards the substantially horizontal configuration;
  the spacing between the front and rear leg lower regions decreases as the shelf units move towards the substantially vertical shelf configuration;
  said front and rear leg lower regions remain in contact with a ground surface at all times; and
  said linkage assembly determines a maximum spacing allowable between the front and rear legs.

The convertible item can have one or more features as described in PCT/AU2019/050780 and Australian patent application number 2019901825, the entire contents of which are incorporated herein by way of reference.

The at least one leave support for supporting the leave can be of any suitable size, shape and construction, and can be made of any suitable material or materials. For example, each leave support can be made of bamboo, wood (particleboard, chipboard, MDF, timber), laminated timbers, laminates, metal and/or plastics material. The leave support can in some embodiments be in the form of a shelf bracket or gusset.

In some embodiments, each leave support can be connected or connectable to a shaft of the drive system, preferably to a rotatable shaft of the drive system. In some embodiments, each leave support can have an opening for receiving a respective shaft of the drive system. In some embodiments, the leave support is in the form of a casting, such as a triangular casting fastened to the leave and having an opening for receiving a shaft of the drive system. The casting can be made of metal. In alternate embodiments the leave support may be any suitable shape and in the form of a moulded, printed, fabricated, cut-out or extruded part and may be made out of any suitable material including polycarbonates, plastics, alloys, aluminium, carbon fibre, wood or cellulose.

In some embodiments, the drive system comprises a respective shaft connected or connectable to each leave support. Each shaft can have a leave support connecting end. Each shaft can have a working region. The working region can be of integral construction with a remainder of the shaft, or the working region can be a separate piece detachably connected to the remainder of the shaft. The shaft may be solid or hollow. Where it is hollow it may accommodate or provide accommodation for wires, tubes or other accessories to be passed through the hollow shaft from the working region end of the shaft to the leave support connecting end to provide a convenient and discrete route for power or light or water to be supplied to each independent leave. The working region can be detachably connected to the remainder of the shaft in any suitable way. The leave support connecting end of the shaft can be connected to the leave support by way of a screwed or threaded connection, key and keyway arrangement, or a splined arrangement, for example. The working region of the shaft can be connected to the remainder of the shaft by way of a screwed connection, key and keyway arrangement, glued, or a splined arrangement, for example. In other embodiments the leave support end, shaft (said shaft can be hollow or solid/not hollow) and connecting end is one integral part capable of connecting or being connectable to the drive system. The leave support integral working part complete with solid or hollow shaft with a connecting or connectable working end can be of a unitary construction and made of any suitable material and produced by either singular or multiple processes including casting, moulding, forming, machining, printing or stamping.

In another embodiment the leave support is one piece that extends along the entire length of the leave and is connected to the leave at both ends or sides of the leave. Such a leave support member may be connected or connectable at at least one end to the drive system.

In some embodiments, the drive system can comprise at least one mounting frame. The mounting frame can be of any suitable size, shape and construction, and can be made of any suitable material or materials. The mounting frame can comprise one or more frame members connected to each other or not connected to each other. A frame member can extend alongside the leave supports. A respective frame member can extend along each side or end of a shelf unit or shelf units, such that the leave supports situated on a first end or first side of the shelf units can be connected to a first frame member, and the leave supports situated on a second end or second side of the shelf units can be connected to a second frame member. The mounting frame can comprise one or more cross pieces connecting the first frame member to the second frame member.

In some embodiments, the drive system comprises at least one mounting frame or mounting frame member extending alongside the leave supports, and said shafts can extend through a wall of the mounting frame such that the working regions and leave supports are located at opposite sides of the wall.

In some embodiments, the drive system comprises at least one mounting frame or mounting frame member extending between adjacently situated spaced apart leave supports, and said shafts can extend through the mounting frame or mounting frame member such that the working regions and leave supports are located at opposite sides of the mounting frame or mounting frame member walls.

The mounting frame or frame member can be of hollow or tubular construction. The working region of the shaft can be located within a hollow interior or channel. The mounting frame or frame member can comprise a beam that has a C- or U-shaped cross section/channel, and the working region of the shaft can be located within the channel. The beam can also be any suitable shaped hollow channel, eg. circle, rectangle or triangle, which has enough room for components of the drive system or drive to be installed inside the hollow.

In some embodiments, the drive system comprises at least one drive connected to the working regions of the shafts, such that the shafts can be rotated or otherwise acted upon in unison. The drive can be of any suitable construction.

In some embodiments, the drive comprises at least one rigid linkage member connected to the working region/s of the shafts by way of pivot pins/fastening pins. The rigid linkage member can be in the form of a bar or tube or other type of load carrying/transferring member. Preferably, the rigid linking member is linear/straight. In some embodiments, the working region is in the form of a flange or bar and the rigid linkage member is pinned to the flange or bar by way of a pivot pin/fastening pin, bolt, sleeve, stepped shoulder fastener, rivet or other suitable fastener.

In some embodiments, the drive comprises a first rigid linkage member connected to the working regions of the shafts at a first end or first side of the shelf units by way of pivot pins/fastener/rivets/pins. In some embodiments, the drive comprises a second rigid linkage member connected to the working regions of the shafts at a second end or second side of the shelf units by way of pivot pins/fastener/rivets/pins.

In some embodiments, the drive comprises a primary rigid linkage member pair and a secondary rigid linkage member pair. The primary linkage member pair can comprise first and second primary linkage members connected to the working regions of the shafts at the first and second ends or sides of the shelf units by way of pivot pins/fastening pins. The secondary linkage member pair can comprise first and second secondary linkage members connected to the working regions of the shafts at the first and second ends or sides of the shelf units by way of pivot pins/fastening pins, and the secondary linkage member pair can be spaced from the primary linkage member pair such that the primary and secondary linkage member pairs are able to pivot in unison and parallel with each other when the leaves are pivoted between the substantially vertical configuration and substantially horizontal configuration.

If the drive comprises two rigid linkage members and these are connected to a said working region, then these can be pinned to the flange at opposing sides or ends of the flange.

In some embodiments, the drive comprises at least one worm gear which engages the working regions of the shafts. In some embodiments, the working region is in the form of a spur gear that meshes with the worm gear. As the worm gear turns, so do the shafts in unison.

In some embodiments, the drive comprises a first worm gear connected to the working regions of the shafts at a first end or side of the shelf units. In some embodiments, the drive comprises a second worm gear connected to the working regions of the shafts at a second end or side of the shelf units.

In some embodiments, the drive comprises at least one bevel gear which engages the working regions of the shafts. In some embodiments, the working region is in the form of a spur gear that meshes with the bevel gear. As the bevel gear turns, so do the shafts in unison.

In some embodiments, the drive comprises a first bevel gear connected to the working regions of the shafts at a first end or side of the shelf units. In some embodiments, the drive comprises a second bevel gear connected to the working regions of the shafts at a second end or side of the shelf units.

In some embodiments, the drive comprises at least one pair of racks that engage the working regions of the shafts. In some embodiments, the working region is in the form of a pinion that meshes with and between the racks. As the shaft/pinion turns, the racks slide back and forth within or relative to the mounting frame or frame member.

In some embodiments, the drive comprises a first pair of racks connected to the working regions of the shafts at a first end or side of the shelf units. In some embodiments, the drive comprises a second pair of racks connected to the working regions of the shafts at a second end or side of the shelf units.

In some embodiments, the drive comprises a plurality of motors, each of which engages a working region of a shaft. Each of the motors can be electrically connected so that all motors turn the shafts in a synchronised manner, both clockwise and counter clockwise.

In some embodiments, the drive comprises a gear train, allowing the motor to be geared down.

In some embodiments, the drive comprises encoders or other electronic means for monitoring and controlling the speed and degree of rotation of the motors.

In some embodiments, the drive comprises a first plurality of motors connected to the working regions of the shafts at a first end or side of the shelf units. In some embodiments, the drive comprises a second plurality of motors connected to the working regions of the shafts at a second end or side of the shelf units.

In some embodiments, the drive comprises at least one chain or belt drive that engages the working regions of the shafts. In some embodiments, the working region is in the form of a sprocket that meshes with the chain or belt drive. In some embodiments the drive can comprise tensioners located between the sprockets. In some embodiments there can be multiple belts or chains between sprockets.

In some embodiments, the drive comprises a first chain or belt drive connected to the working regions of the shafts at a first end or side of the shelf units. In some embodiments, the drive comprises a second chain or belt drive connected to the working regions of the shafts at a second end or side of the shelf units.

The drive can further comprise at least one handle, crank or motor for rotating the shafts in unison. The at least one handle, crank or motor can be operably connected (directly or indirectly) to a shaft, spur gear, worm gear, bevel gear, chain or belt drive, pinion or racks (as the case may be), so as to rotate the shafts in unison. In some embodiments the angle at which a leave extends can be adjustable independently of the other leaves. That is, the shaft that is connected to the leave support can be further pivoted/rotated as required despite engaging the drive. In some embodiments, a locking gear mechanism utilising meshed gears and a pivoting latch that lockingly engages the gears can be used. In some embodiments, a spring-loaded pivot can be used. In some embodiments, a thread lock can be used for fine adjustment of the leave angle.

In some embodiments the shaft that is connected or connectable to each leave support can further be rotated independently of the other connected or connectable drive working end of the mechanisms by way of an independent drive ring that is situated between the frame or housing member and the working end of the shaft such that the leave support shaft is undependably rotatable around the shaft axis via a friction ring and gear mechanism.

In some embodiments, the shaft that is connected or connectable to each leave support can further extend from the working region completely through the frame member and that end of the shaft can engage the handle, crank or motor.

In the substantially horizontal configuration whereby the leaves are positioned next to one another in a substantially horizontal plane, the substantially horizontal surface can be in the form of a table, such as a desk, dining table, workbench or gaming table. In some embodiments the shelf units can be in the form of baskets or containers. In some embodiments the shelf units can be in the form of trays and the substantially horizontal surface can be in the form of a fodder table having a substantially horizontal surface formed by a number of adjacent trays for growing fodder in a vertically stacked manner once the table is transitioned to a vertically stacked configuration. In other embodiments the shelf units can contain a singular holder or multiple holders for small pots or receptacles that might be used for vertical growing systems, or for the production of florae, vegetables, herbs or other organisms that may or may not be intended to be harvested.

In other embodiments the substantially horizontal surface formed by the leaves can be in the form of a mattress or bed base, for supporting a mattress. In other embodiments, the substantially horizontal surface formed by the leaves can be in the form of a lounge base, for supporting one or more cushions of a lounge. In other embodiments, the substantially horizontal surface formed by the leaves can be in the form of a cushioned surface such as a bed, seat or lounge. The substantially horizontal surface can be cushioned or lined with cushioning material, such as sponge rubber or latex.

In the substantially horizontal configuration, the convertible item can have a front (or first) end and a rear (or second) end opposite the front end. In the vertical configuration, the convertible item can have a lower (or front) end and an upper (or rear) end opposite the lower end. The convertible item can have a centre point located midway between the first/front and second/rear ends.

The anti-tip leg system can be of any suitable size, shape and construction, and can be made of any suitable material or materials. For example, the anti-tip leg system can be made of bamboo, wood (particleboard, chipboard, MDF, timber), composites, laminates, any printable material, metal and/or plastics material.

The front leg upper region can be operably connected directly or indirectly to a shelf unit or a part of the drive system in any suitable way. In some embodiments one of the shelf units is a mounting shelf unit. In some embodiments each front leg upper region is fixedly connected to the mounting shelf unit such that the leave of the mounting shelf unit is unable to pivot relative to the front legs. In some embodiments, the front leg upper region is connected to a leave and/or one or more leave supports of the shelf unit. This can be achieved by way of one or more gussets or mounting pins/fastening pins of the front leg assembly, for example. In some embodiments, the front leg upper region is connected to one or more leave supports of a shelf unit using one or more shafts of the drive system.

In some embodiments, each front leg upper region is directly or indirectly pivotally connected to a shelf unit such that the front legs are able to pivot relative to the shelf unit, but with the leave of the shelf unit remaining substantially horizontal at all times. In some embodiments, each front leg upper region can be pinned to a leave support for movement relative thereto.

In some embodiments, each front leg upper region is connected directly or indirectly to the part of the drive system. In some embodiments, each front leg upper region is connected to the part of the drive system such that the front leg upper region can move or pivot relative to the drive system when moving between the different shelf configurations. In some embodiments, the front leg upper region is connected to the part of the drive system such that the front leg upper region cannot move relative to the drive system when moving between the different shelf configurations. In some embodiments, the front leg upper region is connected to a connecting frame, at least one frame member or at least one rigid linkage member of the drive system. This can be achieved by way of one or more mounting pins/fastening pins of the front leg assembly, for example.

Preferably, the upwardly extending pair of front legs are substantially identical to each other. The front legs can extend generally parallel with each other, preferably along opposing sides or ends of a shelf unit or mounting frame or respective frame members of the drive system. In some embodiments each of the front legs and each of the rear legs is positioned alongside the shelf units.

The rear leg upper region can be operably connected to a shelf unit or part of the drive system in any suitable way. In some embodiments, the rear leg upper region is connected directly or indirectly to a shelf unit. In some embodiments, the rear leg upper region is connected to a shelf unit such that the rear legs can move or pivot relative to the shelf unit when moving between the different shelf configurations. In some embodiments, the rear leg upper region is connected to a shelf unit such that the rear leg upper region cannot move relative to the shelf when moving between the different shelf configurations. In some embodiments, the rear leg upper region is connected to a leave and/or one or more leave supports of the shelf unit. This can be achieved by way of one or more gussets or mounting pins/fastening pins of the rear leg assembly, for example. In some embodiments, the rear leg upper region is connected to one or more leave supports of a shelf unit using one or more shafts of the drive system.

In some embodiments, the rear leg upper region is connected directly or indirectly to the part of the drive system. In some embodiments, the rear leg upper region is connected to the part of the drive system such that the rear leg upper region can move or pivot relative to the drive system when moving between the different shelf configurations. In some embodiments, the rear leg upper region is connected to the part of the drive system such that the rear leg upper region cannot move relative to the drive system when moving between the different shelf configurations. In some embodiments, the rear leg upper region is connected to the mounting frame or at least one frame member or at least one rigid linkage member of the drive system. This can be achieved by way of one or more mounting pins/fastening pins of the rear leg assembly, for example.

Preferably, the rear legs are substantially identical to each other. The rear legs can extend generally parallel with each other, preferably along opposing sides or ends of a shelf unit or mounting frame or respective frame members of the drive system. In some embodiments, each rear leg can have a bend such that the lower region of the leg extends towards the rear end/second end and generally alongside a shelf unit. In some embodiments, each upwardly extending leg can be substantially straight/linear and extend towards the rear end/second end, generally alongside a shelf unit.

In some embodiments, the upper regions of the front and rear legs comprise meshed gears or teeth that are pivotally connected (either directly or indirectly) to a shelf unit, preferably to the leave supports of a shelf unit, such that the spacing between the lower ends of the front and rear leg assemblies widens or narrows in a controlled manner.

The anti-tip leg system ensures that the convertible item is always balanced when moving between the two configurations. As the shelf units move towards the substantially horizontal configuration, the spacing between the lower regions of the first and second leg assemblies can widen so as to support and balance the weight of the convertible item and to prevent tipping over. In the vertical configuration, the spacing between the lower regions of the front and rear leg assemblies can narrow such that the leg assemblies can have a small footprint.

The linkage assembly interconnecting the front and rear leg assemblies can be of any suitable size, shape and construction. In some embodiments, the linkage assembly comprises at least one brace having a first end pivotally connected to a front leg and a second end pivotally connected to a rear leg. Preferably, a first brace is connected to a first front and rear leg, and a second brace is connected to a second front and rear leg. When moving to the vertical configuration, the lower regions of the upwardly extending legs of the front and rear leg assemblies can move towards each other and the brace can move towards vertical. When moving to the substantially horizontal configuration, the lower regions of the upwardly extending legs of the front and rear leg assemblies can move away from each other to a maximum spacing dictated by a length of the brace, and the brace can move towards horizontal. In the substantially vertical configuration, the linkage member can extend substantially vertically. In the substantially horizontal configuration, the linkage member can extend at about 45 degrees relative to the horizontal.

In some embodiments, the linkage assembly comprises at least one hinged brace comprising a hinge region, a first end pivotally connected (or hinged) to a front leg and a second end pivotally connected or hinged to a rear leg. Preferably, a first hinged brace is connected to a first front and rear leg, and a second hinged brace is connected to a second front and rear leg. When moving to the substantially vertical configuration, the lower region of the front and rear legs can move towards each other and the hinge region enables the hinged brace to fold upwardly. When moving to the substantially horizontal configuration, the front and rear leg lower regions move away from each other to a maximum spacing dictated by the length of the hinged brace, and the hinged brace unfolds and extends substantially horizontally.

In some embodiments, the linkage assembly can comprise at least one riser extending from the hinged brace to a part of the drive system or a shelf unit. Preferably, a riser extends from each hinged brace. The riser can have an upper end and a lower end. In some embodiments, the lower end of the riser is pivotally connected (or hinged) to the hinge region of the hinged brace, and the upper end of the riser is pivotally connected (or hinged) to a part of the drive system or a shelf unit. In some embodiments, the riser is straight/linear. In some embodiments, the riser is arcuate or bent. The riser can be pivotally connected (or hinged) to the mounting frame or frame member. When moving to the vertical configuration, the front and rear leg lower regions move towards each other and the riser extends at an angle closer to vertical. When moving to the substantially horizontal configuration, the front and rear leg lower regions move away from each other to a maximum spacing dictated by the length of the hinged brace, and the riser can extend substantially parallel with the front legs when in the substantially horizontal configuration. When moving from the vertical configuration, the riser can push on the hinged brace and cause the front and rear leg lower regions to move away from each other. When moving from the horizontal configuration, the riser can pull on the hinged brace and cause the front and rear leg lower regions to move towards each other.

In some embodiments, the linkage assembly comprises at least one further brace comprising a first end pivotally connected (or hinged) to a front leg upper region and a second end pivotally connected or hinged to a rear leg upper region. Preferably, a first further brace is connected to first front and rear leg upper regions, and a second further brace is connected to second front and rear leg upper regions. When moving to the vertical shelf configuration, the further brace moves towards vertical. When moving to the substantially horizontal configuration, the further brace moves towards horizontal.

In some embodiments, the anti-tip system can further comprise reinforcements such as a cross piece or gusset extending between the front legs. In some embodiments, the anti-tip system can further comprise reinforcements such as a cross piece or gusset extending between the rear legs.

In some embodiments, the front and rear legs are elongate tubular members. In some embodiments, the braces and risers are elongate tubular members. In some embodiments, the braces and risers are bars or rods.

The at least one wheel can comprise one or more rollers or castors (or other types of wheels). Preferably, a castor or wheel or a castor or wheel pair is pinned to each lower region. In some embodiments the wheels can be retractable. For example, the wheels can be on hinges and a lever with an over-centre locking mechanism can be used to extend and retract the wheels. The at least one wheel can have a brake or other locking mechanism to stop it from rolling.

The convertible item can comprise a holding or locking mechanism for holding or locking the convertible item in the substantially vertical configuration and/or in the substantially horizontal configuration or in a position there between, such that the drive system cannot allow pivoting from one configuration to the other. Any suitable holding or locking mechanism can be used. In some embodiments this involves a clamp, keeper, magnet, electro magnet, locking pin or latch.

The convertible item can comprise at least one actuator or dampener for pivoting, or helping a person pivot in a safe and controlled manner, the shelf units into the vertical configuration or out of the vertical configuration. The actuator or dampener can control the pivot motion. The actuator or dampener can be controlled by a hand held remote or push button. The actuator or dampener can help offset the lift weight and also prevent the shelf units from pivoting downwardly too quickly. The actuator or dampener can act as a locking mechanism.

In some embodiments the convertible item, such as an item of furniture, can comprise a front end and a rear end. The item can comprise a plurality of shelf units. Each shelf unit can comprise a substantially horizontally extending leave and at least one leave support for supporting the leave. The item can comprise a drive system which can be operably connected to each leave support such that the leaves remain substantially horizontal when the shelf units are moved between (1) a substantially vertical shelf configuration whereby the leaves extend in spaced substantially horizontal parallel planes above one another, and (2) a substantially horizontal configuration whereby the leaves are positioned next to one another in a substantially horizontal plane between the front and rear ends. The item can comprise an anti-tip leg system. The anti-tip leg system can comprise a front leg assembly comprising at least an upwardly extending pair of front legs spaced apart from one another. Each front leg can comprise a front leg upper region operably connected directly or indirectly to a shelf unit or a part of the drive system and a front leg lower region supporting at least one wheel. The anti-tip leg system can comprise a rear leg assembly comprising at least an upwardly extending pair of rear legs spaced apart from one another. Each rear leg can comprise a rear leg upper region operably connected directly or indirectly to a shelf unit or a part of the drive system, and a rear leg lower region supporting at least one wheel. The anti-tip leg system can comprise a linkage assembly interconnecting the front and rear leg assemblies. A spacing between the front and rear leg lower regions can increase as the shelf units move towards the substantially horizontal configuration. The spacing between the front and rear leg lower regions can decrease as the shelf units move towards the substantially vertical shelf configuration. The front and rear leg lower regions can remain in contact with a ground surface at all times. The linkage assembly can determine a maximum spacing allowable between the front and rear legs.

In some embodiments, each of the front legs and each of the rear legs can be positioned alongside the shelf units. In some embodiments, one of the shelf units can be a mounting shelf unit and each front leg upper region can be fixedly connected to the mounting shelf unit such that the leave of the mounting shelf unit is unable to pivot relative to the front legs. In some embodiments, each rear leg upper region can be pivotally connected to a part of the drive system such that the leave of each shelf unit is able to pivot relative to the rear legs. In some embodiments, the part of the drive system can be a mounting frame which extends along both sides of each shelf unit, and each rear leg upper region can be pivotally connected to the mounting frame. In some embodiments, the mounting frame can house a drive of the drive system. In some embodiments, the drive system can comprise a respective shaft connected to each leave support. Each shaft can comprise a working region that is located within the mounting frame. The drive can be connected to the working regions such that the shafts can be rotated in unison. In some embodiments, the linkage system can comprise at least one brace comprising a first end pivotally connected to a front leg and a second end pivotally connected to a rear leg. In some embodiments, the linkage system can comprise two braces pivotally connecting the front legs to the rear legs. In some embodiments, each of the front legs can comprise an about 90° bend such that the lower region of each front leg below the bend extends towards the front end and the upper region of each said front leg above the bend extends upwardly but non-vertically towards the front end. In some embodiments, the lower region of each front leg below the bend can extend substantially linearly towards the front end and the upper region of each front leg above the bend can extend upwardly and substantially linearly towards the front end. In some embodiments, the first end of the at least one brace can be connected to the bend in the front leg and can extend upwardly towards the rear leg. In some embodiments, the brace can be straight. In some embodiments, each of the rear legs can be straight. In some embodiments, each of the rear legs can extend downwardly towards the rear end.

In some embodiments, one of the shelf units can be a mounting shelf unit and each front leg upper region can be pivotally connected to the mounting shelf unit such that the leave of the mounting shelf unit is able to pivot relative to the front legs. In some embodiments, each rear leg upper region can be pivotally connected to the mounting shelf unit such that the leave of the mounting shelf unit is able to pivot relative to the rear legs. In some embodiments, each of the front and rear legs can be pivotally connected to a leave support of the mounting shelf unit. In some embodiments, the front and rear upper regions can comprise meshed gears or teeth that coordinate the pivotal movement of the front legs relative to the rear legs. In some embodiments, the linkage system can comprise at least one hinged brace comprising a first end pivotally connected to a front leg, a second end pivotally connected to a rear leg, and a hinge region between the first and second ends. In some embodiments, the first end of the at least one hinged brace can be connected to the front leg lower region and the second end of the at least one hinged brace can be connected to the rear leg lower region. In some embodiments, the linkage system can comprise at least one riser comprising a first end pivotally connected to the hinge region and a second end pivotally connected to a part of the drive system at or near to the rear end such that the hinged brace can fold upwardly. In some embodiments, the part of the drive system can be a mounting frame which extends along both sides of each shelf unit, and the second end of the riser can be pivotally connected to the mounting frame. In some embodiments, the mounting frame can house a drive of the drive system. In some embodiments, when moving from the vertical configuration, the riser pushes on the hinged brace to cause the front and rear leg lower regions to move away from each other. In some embodiments, when moving from the horizontal configuration, the riser pulls on the hinged brace to cause the front and rear leg lower regions to move towards each other.

In some embodiments, the leave support of the mounting shelf unit can comprise a pair of spaced side walls each side of the leave of the mounting shelf unit. In some embodiments, the mounting frame can extend along both sides of each shelf unit and between the spaced side walls of the mounting shelf unit. In some embodiments, each of the front legs can be straight and extend downwardly towards the front end. In some embodiments, each of the rear legs can be straight and extend downwardly towards the rear end. In some embodiments, the at least one riser can be substantially linear. In some embodiments, the at least one riser can be substantially arcuate. In some embodiments, the linkage system can comprise two hinged braces pivotally connecting the front legs to the rear legs and two risers. In some embodiments, the drive system can comprise a respective shaft connected to each leave support, each shaft can comprise a working region that is located within the mounting frame, and the drive can be connected to the working regions such that the shafts can be rotated in unison.

In some embodiments, each front leg upper region can be pivotally connected to a part of the drive system such that the leave of the mounting shelf unit can pivot relative to the front legs. In some embodiments, each said rear leg upper region can be pivotally connected to the part of the drive system such that the leave of the mounting shelf unit can pivot relative to the rear legs. In some embodiments, the part of the drive system can be a mounting frame which extends along both sides of the mounting shelf unit, and the mounting frame can be operably connected to a drive of the drive system. In some embodiments, the drive system can comprise a respective shaft connected to each said leave support, and each said shaft can comprise a working region that is connected to the drive such that the leaves can be pivoted in unison. In some embodiments, the linkage system can comprise at least one hinged brace comprising a first end pivotally connected to a front leg, a second end pivotally connected to a rear leg, and a hinge region between the first and second ends. In some embodiments, the first end of the at least one hinged brace can be connected to the front leg lower region and the second end of the at least one hinged brace can be connected to the rear leg lower region. In some embodiments, the linkage system can comprise at least one riser comprising a first end pivotally connected to the hinged brace and a second end pivotally connected to a part of the drive system at or near to the rear end such that the hinged brace can fold upwardly. In some embodiments, when moving from the vertical configuration, the riser can push on the hinged brace to cause the front and rear leg lower regions to move away from each other. In some embodiments, when moving from the horizontal configuration, the riser can pull on the hinged brace to cause the front and rear leg lower regions to move towards each other. In some embodiments, the linkage system can comprise at least one further brace comprising a first end pivotally connected to the front leg upper region and a second end pivotally connected to the rear leg upper region. In some embodiments, each of the front legs can be straight and extend downwardly towards the front end. In some embodiments, each of the rear legs can be straight and extend downwardly towards the rear end. In some embodiments, the at least one riser can be bent. In some embodiments, the linkage system can comprise two hinged braces and two further braces pivotally connecting the front legs to the rear legs, and two risers.

In some embodiments, the drive system can comprise at least one actuator or at least one pair of actuators for creating a lift assist. Thereby, less force may be needed to transition the item from one configuration to the other (eg. from a table to a set of shelves).

In some embodiments, the drive system can comprise at least one actuator or at least one pair of actuators for slowing or otherwise controlling the transition, preferably the speed of transition, from one configuration to the other, independently of how much weight is placed on the shelves/leaves. This can make it safer for the user and also avoiding a hard stop at the end of the transition.

Any suitable type of actuator can be used for lift assist. For example, a gas spring strut, rotary actuator or a rotary spring can be used. In some embodiments, an actuator can extend between a frame member and part of the drive (eg. sprocket) and apply torque to that part of the drive (eg. sprocket), thereby creating a lift assist. Thus, less force is needed to transition the item. The gas spring strut can be positioned in such a way that when the item is transitioned into a table for example, the gas spring passes over centre and creates a small amount of torque in the opposite direction, thereby pushing the item into a table configuration. The item can have a mechanical stop that prevents it from rotating further than horizontal.

Any suitable type of actuator can be used for controlling the transition speed. For example, a gas dampener can be used. In some embodiments, an actuator can extend between the frame member and part of the drive (eg. sprocket) and apply torque to that part of the drive (eg. sprocket). Its function is to restrict the rotational speed of the sprocket in either one direction or both directions. This results in the item always transitioning slowly independently of how much weight is placed on the shelves/leaves, making it safer for the user and also avoiding a hard stop at the end of the rotation.

In some embodiments, a single actuator or an actuator pair can have both a dampening function and a lift assist function.

In some embodiments the actuator is a gas strut having a first end connected to a leg assembly and a second end connected to the drive system or a shelf unit. In some embodiments, the actuator is an electric actuator having a first end connected to a leg assembly and a second end connected to the drive system or a shelf unit. In some embodiments the convertible item comprises two actuators.

In other embodiments the one or two or more actuators, gas strut, hydraulic strut or spring connected between the main support frame and the at least one shelf support member (eg. leave support) at a point that is offset to the main pivot axis of the at least one shelf support member (eg. leave support) such that as the shelf support member (eg. leave support) is activated during the transition from either a vertical (shelf) configuration into a horizontal (table) configuration or from a horizontal (table) configuration into a vertical configuration, the at least one actuator, gas strut, hydraulic strut, dampener or spring exerts a restrictive force on the at least one shelf support member (eg. leave support) to inhibit or control the free fall motion of the convertible item from a vertical configuration to a substantially horizontal configuration. The at least one actuator, gas strut, hydraulic strut, dampener, cam or spring may also assist to reduce the load needed to transition the item from a substantially horizontal configuration into the vertical stacked shelve configuration.

The convertible item can comprise a counterweight for helping a person safely pivot the shelf units into the vertical configuration. Any suitable type of counterweight can be used. In some embodiments a counterweight is installed on or adjacent a shelf unit at the first end/front end of the item.

Each shelf unit can be of any suitable size, shape and construction, and can be made of any suitable material or materials. For example, each shelf unit can be made of bamboo, wood (particleboard, chipboard, MDF, timber), composites, laminates, any printable material metal and/or plastics material.

Each shelf unit can be of similar construction or of differing construction. Each shelf unit can be of similar appearance or of differing appearance. Each shelf unit can be of any suitable length, width, height and thickness.

In some embodiments a, or each, shelf unit simply provides a leave for supporting one or more articles or items. In some embodiments a, or each, shelf unit is in the form of a tray, basket, cupboard, container cabinet, drawer or other closable compartment.

Each shelf unit comprises a substantially horizontally extending leave. Each leave remains substantially perfectly horizontal in any configuration, including when being transitioned between the substantially horizontal configuration and vertical configuration. This is so that any article or item placed on any of the leaves does not fall off whilst the shelf units are being transitioned from a substantially horizontal configuration to a vertically stacked configuration.

Preferably, the leave is longer than it is wide. That is, preferably the leave is elongate, having opposed longitudinal ends and opposed ends. Each leave can comprise a top surface, a bottom surface, oppose longitudinal ends, and opposed ends. Each leave can be in the form of a tray, panel or board, such as a wooden panel or board. If desired, the leave can be laminated.

In some embodiments, the leave can have one or more slots or slits for providing clearance for one or more linkage components of the linkage system or drive system when pivoting between the substantially horizontal (eg. table) and vertical shelf configurations.

In some embodiments the leave can be discontinuous, being in separate pieces or sections. For example, the leave can comprise two, three, four, five, six or more spaced apart panels/panel sections.

In some embodiments, the drive system can comprise a frame member extending between adjacent leave panels/panel sections each comprising a leave support, a drive can extend within the frame member, and a shaft can extend through the frame member from one leave support to the other, and the shaft can have a working region located within the frame member.

In some embodiments the leave support can comprise one or more side walls extending downwardly from the leave (much like shelf brackets or gussets), preferably vertically relative to the leave and preferably parallel with the frame member. In some embodiments the leave support can comprise spaced side walls extending downwardly from the leave, preferably vertically relative to the leave and preferably parallel with the frame member. In some embodiments the leave support can comprise one, two, three, four, five, six or even more side walls extending downwardly from the leave. Each side wall can be of integral construction with the leave or connectable to the leave. Each side wall can be in the form of a panel or board fastened to the leave by way of mechanical or non-mechanical fasteners, e.g. screws, nails, adhesive et cetera.

In embodiments where the leave is discontinuous, being in separate pieces or sections, one or more side walls may extend downwardly from each leave piece or section and preferably parallel with the frame member.

In some embodiments the leave support can comprise one or more rear walls extending downwardly from the leave and/or between adjacent side walls of the leave support. Preferably the rear wall extends vertically from the leave or vertically relative to the leave. In some embodiments a rear wall can extend from the leave to a side wall of the leave support. In some embodiments a rear wall can extend between the leave and each side wall of the leave support. The rear wall can be of integral construction with the leave and/or side wall/s or connectable to the leave and/or side wall/s. The rear wall can be in the form of a panel or board fastened to the leave and one or more side walls by way of mechanical or non-mechanical fasteners, e.g. screws, nails, adhesive et cetera.

In some embodiments, the rear wall can be shaped such that there is room for a person's knees beneath the substantially flat surface (e.g. table top) when seated at the substantially horizontal surface (e.g. table top). In some embodiments the rear wall can be tapered, arched or arcuate as it extends towards a periphery of the substantially horizontal surface (e.g. table top).

In some embodiments, the rear wall can have one or more slots or slits for providing clearance for one or more components of the drive system when pivoting between the different configurations.

In some embodiments, one or more leave supports can comprise a drop-down lip or flap that can hide a gap or gaps between the leaves when in the shelf configuration. In some embodiments, a lip can extend upwardly to prevent items inside one or more of the shelves from falling out.

The convertible item can have any suitable number of shelf units. For example, the convertible item can have two, three, four, five, six, seven, eight, nine, 10, 11, 12 or even more shelf units. The number of shelf units will depend on factors such as the dimensions of the room in which the convertible item is to be located. For example, for rooms with standard ceiling heights, the convertible item (e.g. table and shelves) can have, for example, five, six, seven, eight, nine or 10 shelf units. Preferably the convertible item (e.g. table and shelves) has six, seven or eight shelf units. More preferably, the convertible item (e.g. table and shelves) has seven shelf units.

One or more of the shelf units can have a secondary shelf located beneath the substantially horizontally extending leave ('the main leave'). The secondary shelf can be dimensioned so as to be hidden beneath the substantially horizontal surface (e.g. table top) formed by the main leaves when in the substantially flat horizontal configuration, and the secondary shelf can be dimensioned so as to serve as a secondary accessible shelf when in the shelf configuration.

The secondary shelf can be of any suitable size, shape and construction, and can be made of any suitable material or materials. Each secondary shelf can be of any suitable length, width and height. Ideally, each secondary shelf will be made of the same material or materials as the shelf unit. Ideally, each secondary shelf will complement/match in with the overall look or appearance of the shelf unit.

The secondary shelf preferably has a substantially horizontally extending secondary leave. Preferably, the secondary leave is spaced beneath its main leave so as to accommodate one or more articles or items. Preferably, the secondary leave is longer than it is wide. That is, preferably the secondary leave is elongate having opposed longitudinal ends and opposed ends. Each secondary leave can comprise a top surface, a bottom surface, oppose longitudinal ends, and opposed ends. Each secondary leave can be in the form of a panel or board, such as a wooden panel or board.

The secondary shelf can have a secondary leave support for supporting the secondary leave. The secondary leave support can be of any suitable size, shape and construction, and can be made of any suitable material or materials. For example, each secondary leave support can be made of any printable material, bamboo, wood (particleboard, chipboard, MDF, timber), laminates, composites, metal and/or plastics material. The secondary leave support can in some embodiments be in the form of a shelf bracket or gusset.

In some embodiments the secondary leave support can comprise one or more side walls extending upwardly from the secondary leave (much like shelf brackets or gussets), preferably vertically relative to the secondary leave and preferably parallel with the frame member (although this need not be the case). In some embodiments the side wall can extend from the secondary leave to the main leave. In some embodiments the secondary leave support can comprise spaced side walls extending upwardly from the secondary leave, preferably vertically relative to the leave and preferably parallel with the frame member (although this need not be the case). In some embodiments the secondary leave support can comprise one, two, three, four, five, six or even more side walls extending from the secondary leave. Each side wall can be of integral construction with the secondary leave or connectable to the secondary leave. Each side wall can be of integral construction with the main leave or connectable to the main leave. Each side wall can be in the form of a panel or board fastened to the secondary leave by way of mechanical or non-mechanical fasteners, e.g. screws, nails, adhesive et cetera.

In some embodiments the secondary leave support can comprise one or more rear walls extending upwardly from the secondary leave and/or between adjacent side walls of the secondary leave support and/or to the main leave. Preferably the rear wall extends vertically from the secondary leave or vertically relative to the secondary leave. In some embodiments a rear wall can extend upwardly from the secondary leave. In some embodiments a rear wall can extend upwardly from the secondary leave to the main leave. In some embodiments a rear wall can extend from the secondary leave to a side wall of the secondary leave support. In some embodiments a rear wall can extend between the secondary leave and each side wall of the secondary leave support. In some embodiments a rear wall can extend between the secondary leave and main leave, and each side wall of the secondary leave support. The rear wall can be of integral construction with the secondary leave and/or main leave and/or side wall/s or connectable to a leave/s and/or side wall/s. The rear wall can be in the form of a panel or board fastened to the secondary and/or main leave and one or more side walls by way of mechanical or non-mechanical fasteners, e.g. screws, nails, adhesive et cetera.

In some embodiments the leave support and secondary leave support or components thereof are one and the same. In some embodiments one or more side walls of the leave support and one or more side walls of the secondary leave support are one and the same. In some embodiments the rear wall of the leave support and the rear wall of the secondary leave support are one and the same.

In some embodiments, the rear wall of the secondary leave support can be shaped such that there is room for a person's knees beneath the substantially flat surface (e.g. table top) when seated at the substantially flat surface (e.g. table top). In some embodiments the rear wall can be tapered, arched or arcuate as it extends towards a periphery of the substantially flat surface (e.g. table top).

As mentioned above, in some embodiments a, or each, shelf unit can comprise one or more trays, doors or slidable drawers for forming a cabinet, cupboard, set of drawers or other closable compartment. In some embodiments a, or each, secondary shelf unit can comprise one or more trays, doors for forming a cabinet, cupboard or other closable compartment. The one or more doors can be hinged or slidable for movement between open and closed positions. The one or more doors can be hinged or slidable for movement relative to a leave or leave support. In some embodiments a, or each, secondary shelf unit can comprise one or more slidable trays or drawers for forming a set of drawers.

In some embodiments a, or each, shelf or secondary shelf unit can comprise a hanging rail or rod, or rope, wire or elastic retainer extending between the side walls.

In some embodiments, each secondary leave support can be connected or connectable to a (rotatable) shaft of the drive system. In some embodiments, each secondary leave support can have an opening for receiving a respective (rotatable) shaft of the drive system. In some embodiments, the secondary leave support is in the form of a casting, such as a triangular casting fastened to the secondary leave and having an opening for receiving a shaft of the drive system. The casting can be made of metal.

Any of the features described herein can be combined in any combination with any one or more of the other features described herein within the scope of the invention.

The reference to any prior art in this specification is not, and should not be taken as an acknowledgement or any form of suggestion that the prior art forms part of the common general knowledge.

BRIEF DESCRIPTION OF DRAWINGS

Preferred features, embodiments and variations of the invention may be discerned from the following Description of Embodiments which provides sufficient information for those skilled in the art to perform the invention. The Description of Embodiments is not to be regarded as limiting the scope of the preceding Summary of the Invention in any way. The Description of Embodiments will make reference to a number of drawings as follows:

FIG. 16 shows in side elevation convertible shelves having an anti-tip leg system, in a vertical shelf configuration, according to an embodiment of the present invention.

FIG. 17 shows the convertible shelves of FIG. 16 in perspective.

DESCRIPTION OF EMBODIMENTS

Figure 1:
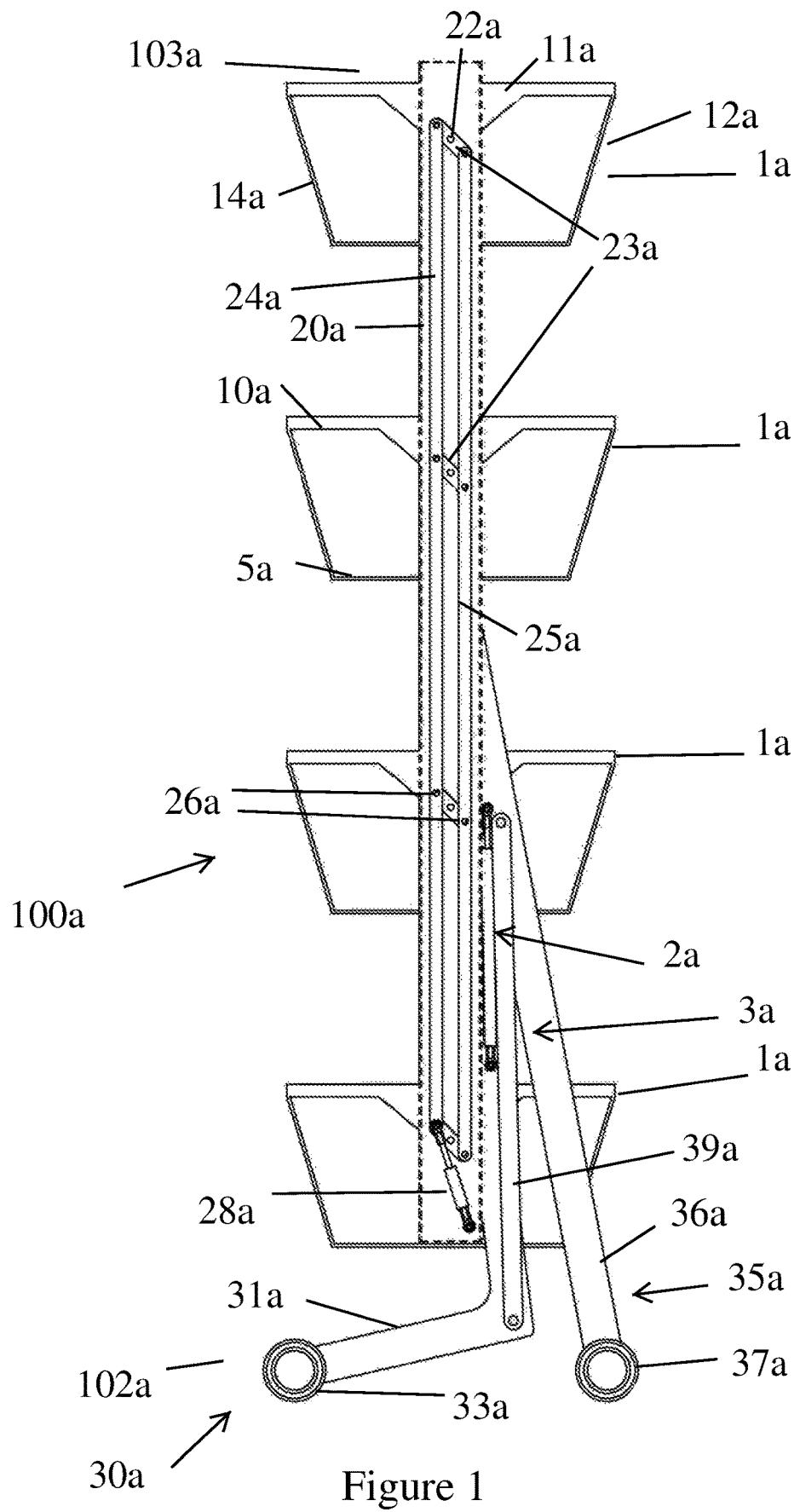
FIG. 1 shows in detailed side elevation a convertible table and shelves having an anti-tip leg system, in a vertical shelf configuration, according to an embodiment of the present invention.
Figure 2:
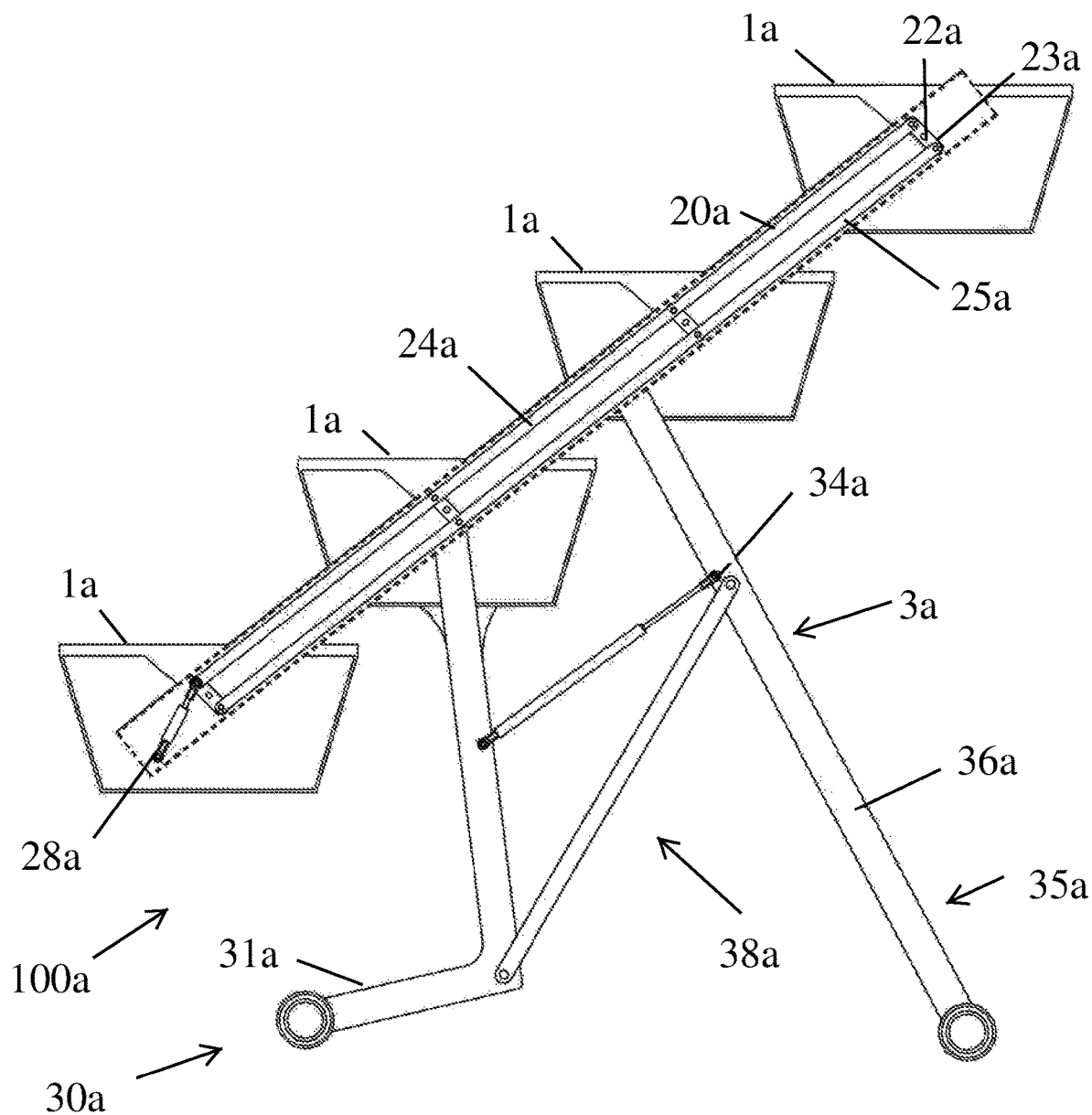
FIG. 2 shows in detailed side elevation the convertible table and shelves of FIG. 1, but transitioning between the vertical shelf and substantially horizontal surface configurations.

In the Figures like reference numerals refer to like features.

Figure 3:
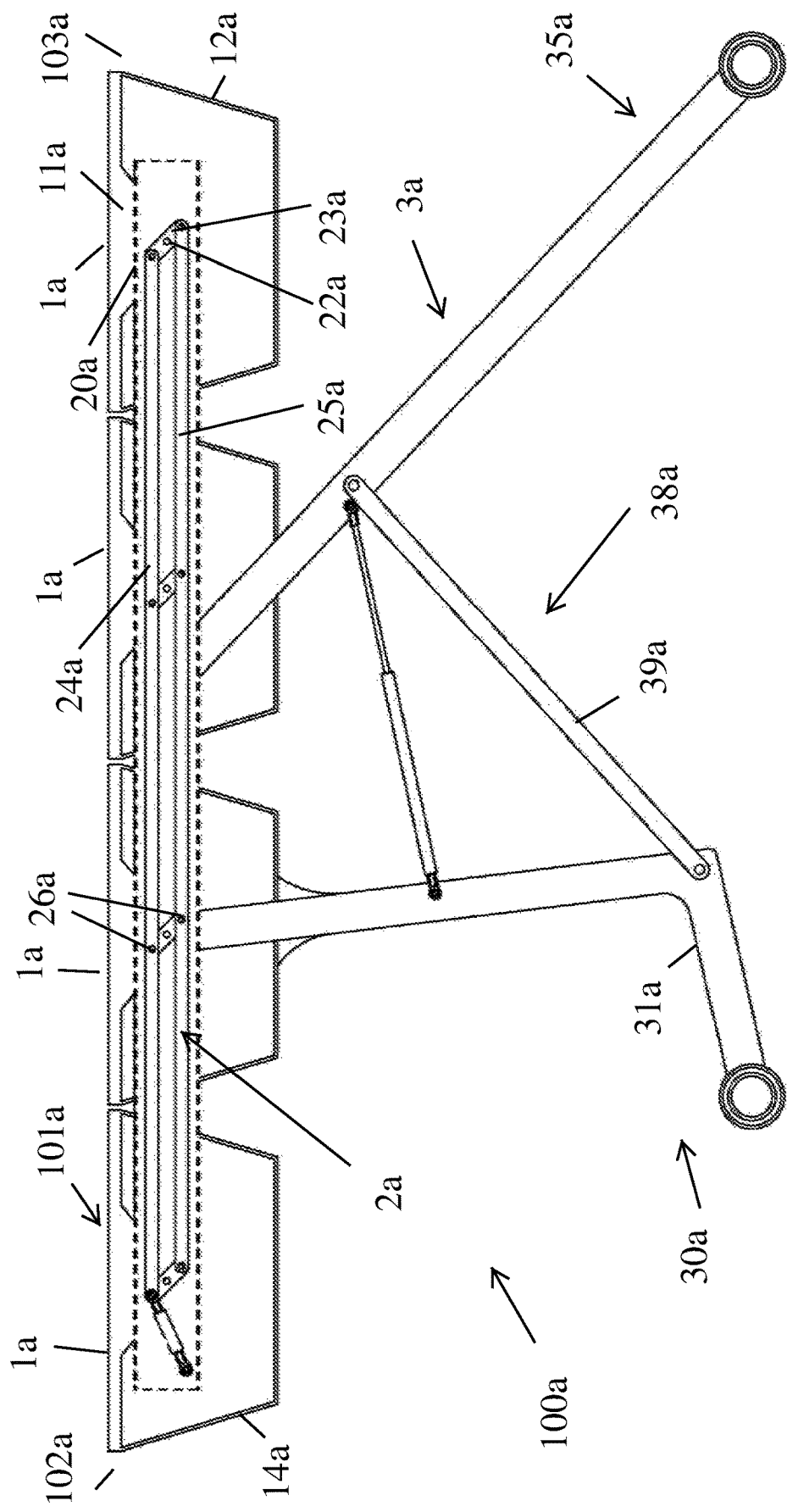
FIG. 3 shows the convertible table and shelves of FIG. 2 in detailed side elevation, but in the substantially horizontal surface configuration.

Referring first to FIGS. 1-4, there is shown a convertible item 100a in the form of a convertible table and shelves 100a that is configurable either as a table having a table top 101a (ie. substantially horizontal surface configuration) as seen in FIG. 3, or shelves as seen in FIG. 1. In the substantially horizontal surface configuration, the convertible item 100a has a first/front end 102a and a second/rear end 103a opposite the first end 102a. In the vertical shelf configuration, the convertible item has a lower end 102a and an upper end 103a opposite the lower end 102a. The convertible table and shelves 100a has a centre point located midway between the first and second ends and the upper and lower ends 102a, 103a.

The convertible table and shelves 100a includes first, second, third and fourth shelf units 1a, a drive system 2a operably connected to each shelf unit 1a, and an anti-tip leg system 3a for supporting the shelf units 1a and drive system 2a when moving between the two configurations.

Figure 4:
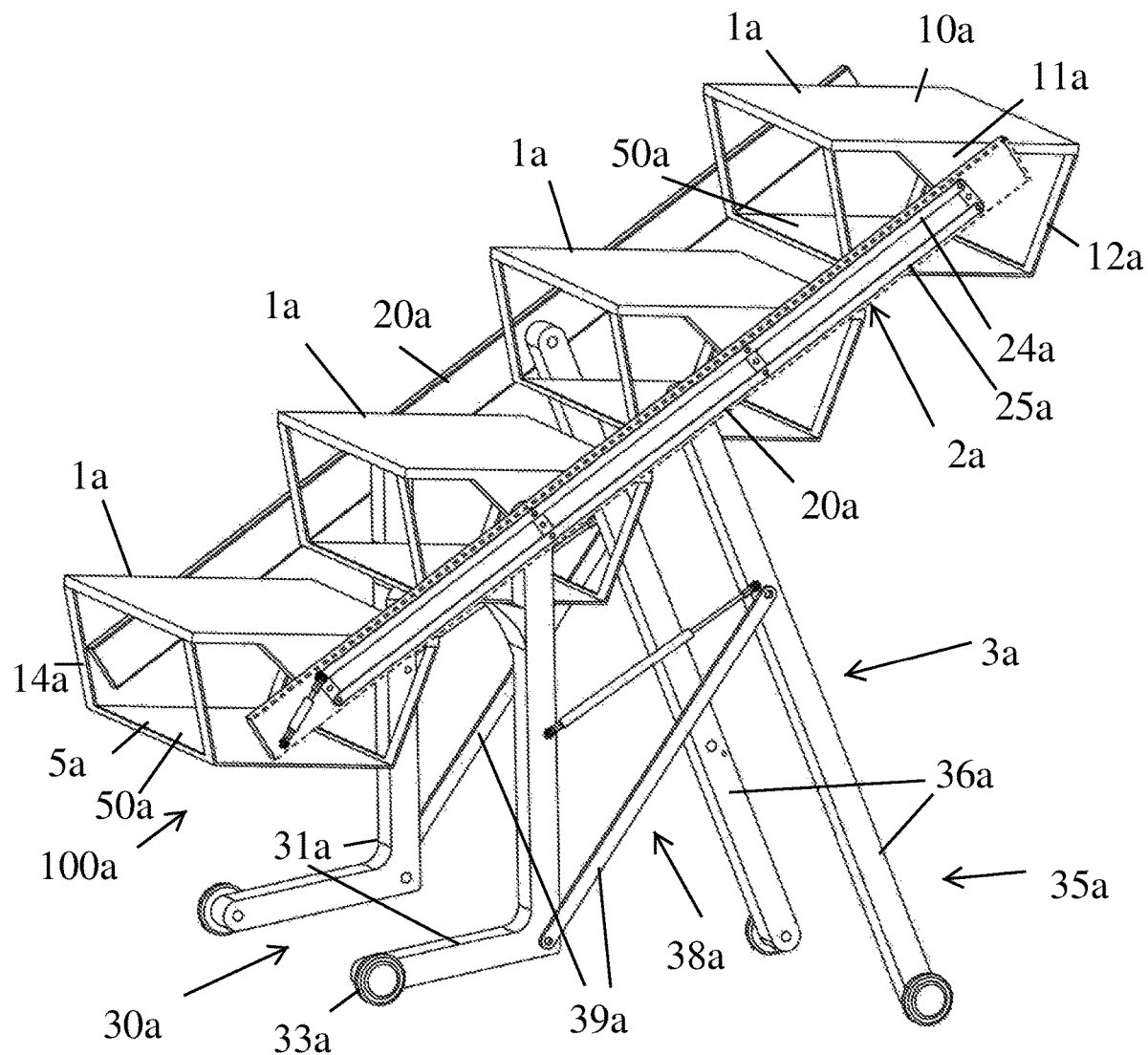
FIG. 4 is a partially detailed side perspective view of the convertible table and shelves shown in FIG. 2.

As seen in FIG. 4, each shelf unit 1a comprises a substantially horizontally extending leave 10a and a leave support including a pair of spaced apart (partial) side walls 11a extending downwardly from the leave 10a, a (partial) rear wall 12a extending between the leave 10a and the side walls 11a, and a (partial) front wall 14a extending between the leave 10a and the side walls 11a. The side walls 11a extend perpendicularly of the leaves 10a. The partial rear walls 12a and partial front walls 14a extend upwardly between the side walls 11a.

Each shelf unit 1a has a secondary shelf 5a located beneath the main leave 10a. The secondary shelf 5a is dimensioned so as to be hidden beneath the table top 101a formed by the main leaves 10a of the shelf units 1a when in the table configuration, and each secondary shelf 5a is dimensioned so as to serve as an additional accessible shelf when in the vertical shelf configuration.

The shelf units 1a are plastic, wooden or metallic panels, boards or frames (in some embodiments laminated) or fastened together with mechanical fasteners such as screws and optionally non-mechanical fasteners such as adhesive.

As seen in FIG. 4, each secondary shelf 5a includes a substantially horizontally extending secondary leave 50a and a pair of spaced apart (partial) secondary side walls 11a extending between the main leave 10a and the secondary leave 50a. The rear wall 12a and front wall 14a of the shelf unit 1a extends to the secondary leave 50a.

The drive system 2a is connected to each leave support such that the main leaves 10a are able to pivot in unison and parallel with each other between (1) a vertical shelf configuration whereby the leaves 10a extend in spaced substantially horizontal parallel planes above one another (see FIG. 1), and (2) a substantially horizontal surface configuration whereby the leaves 10a are positioned next to one another to form a substantially horizontal surface 101a (see FIG. 3).

The drive system 2a comprises a mounting frame comprising a pair of hollow frame members 20a, 20a (shown in phantom in most of the Figures) each having a channel and a plurality of shafts 22a, each having a working end in the form of a bar 23a located within a channel and another end secured to a leave support side wall 11a. Each bar 23a has opposing ends and these ends have openings for pivot pins.

The drive system 2a further includes a drive in the form of a rigid linkage bar member pair 24a, 25a located within each frame member 20a. The linkage bar members 24a, 25a extend parallel with each other at all times. Each rigid linkage bar member 24a, 25a is connected to each bar 23a by way of a pivot pin/fastening pin 26a extending through a respective opening in the member 24a, 25a. Rotation of the bars 23a in unison within the channel causes the shelf units 1a to rotate in unison. The parallel-extending rigid linkage bar members 24a, 25a move all of the bars 23a in unison, to ensure that all shelf units 1a rotate in unison. As bar member 24a moves in one direction, the other bar member 25a moves in the opposite but parallel direction.

The anti-tip leg system 3a includes a front leg assembly 30a. The front leg assembly 30a includes an upwardly extending pair of legs 31a, each having an upper end rigidly connected to a shelf unit 1a and a lower region supporting a wheel 33a (roller or castor). The upwardly extending legs 31a extend generally parallel with each other, alongside the shelf unit 1a and respective frame member 20a. Each upwardly extending leg 31a has an about 90° bend such that the lower region of the leg 31a extends towards the front end 102a and generally in a parallel plane with each frame member 20a. The upwardly extending legs 31a are elongate tubular members.

Each upper region of the upwardly extending legs 31a of the front leg assembly 30a is fixedly connected to shelf unit 1a such that the shelf unit 1a is unable to move/pivot relative to the upwardly extending leg 31a and so its leave 10a must always stay horizontal. In this way, when the convertible item 100a is moved to the vertical shelf configuration or substantially horizontal surface configuration, the drive 2a causes all of the leaves 10a to remain substantially horizontal relative to the mounting frame.

The anti-tip leg system 3a includes a rear leg assembly 35a pivotally connected to the frame members 20a of the drive system 2a. The rear leg assembly 35a includes an upwardly extending pair of legs 36a, each having an upper region pivotally connected to a frame member 20a of the drive system 2a and a lower region supporting a wheel 37a (eg. roller or castor). The upwardly extending legs 36a are elongate tubular members. The upwardly extending legs 36a extend parallel with each other, alongside a shelf unit 1a and respective frame member 20a. Each upwardly extending leg 36a is straight/linear and extends at an angle (relative to vertical) towards the rear end 103a. Each upper region of each upwardly extending leg 36a is pivotally connected to a frame member 20a such that the shelf units 1a are able to rotate relative to the upwardly extending legs 36a but such that their leaves 10a always remain horizontal. In this way, when the convertible item 100a is moved to the shelf configuration or substantially horizontal surface configuration by way of the pivoting frame members 20a, the drive 2a causes all of the leaves 10a to remain substantially horizontal.

The anti-tip leg system 3a includes a linkage assembly 38a extending between the upwardly extending legs 31a, 36a of each of the front and rear leg assemblies 30a, 35a. The linkage assembly 38a includes a brace 39a having a first end pivotally connected using a pivot pin to an upwardly extending leg 31a of the front assembly 30a and a second end pivotally connected using a pivot pin to an upwardly extending leg 36a of the rear assembly 35a. A first brace 39a is connected to a first pair of upwardly extending legs 31a, 36a and a second brace 39a is connected to a second pair of upwardly extending legs 31a, 36a. When moving to the shelf configuration, the lower regions of the upwardly extending legs 31a, 36a move towards each other and the braces 39a move towards vertical. When moving to the substantially horizontal surface configuration, the lower regions of the upwardly extending legs 31a, 36a move away from each other to a maximum spacing dictated by a length of each brace 39a, and the braces 39a moves towards horizontal. In the shelf configuration, the braces 39a extend substantially vertically. In the substantially horizontal surface configuration, the braces 39a extends at about 45 degrees relative to the horizontal.

The convertible item 100a can comprise a holding or locking mechanism (eg. clamp) for holding or locking the convertible item 100a in the shelf configuration and/or in the substantially horizontal surface configuration or in a position there between, such that the drive system 2a cannot allow pivoting from one configuration to the other. In one embodiment the anti-tip leg system 3a comprises a clamp mechanism.

The drive system 2a further includes an actuator 28a that has both a dampening function and a lift assist function. The actuator 28a is a gas strut, having one end pinned to frame member 20a and another end pinned to bar member 24a.

The anti-tip leg system 3a includes a shock absorber 34a. The shock absorber 34a is a gas strut, having its ends pinned to a pair of the upwardly extending legs 31a, 36a.

In use, the configurable table and shelves 100a can be configured as a table shown in FIG. 3 or configured as shelves as shown in FIG. 1. In order to change from the table configuration to the shelf configuration, a person raises the rear end 103a of the table top 101a so that the shelf units 1a swing into the shelf configuration. The locking mechanism stops the drive system 2a from pivoting by accident.

Figure 5:
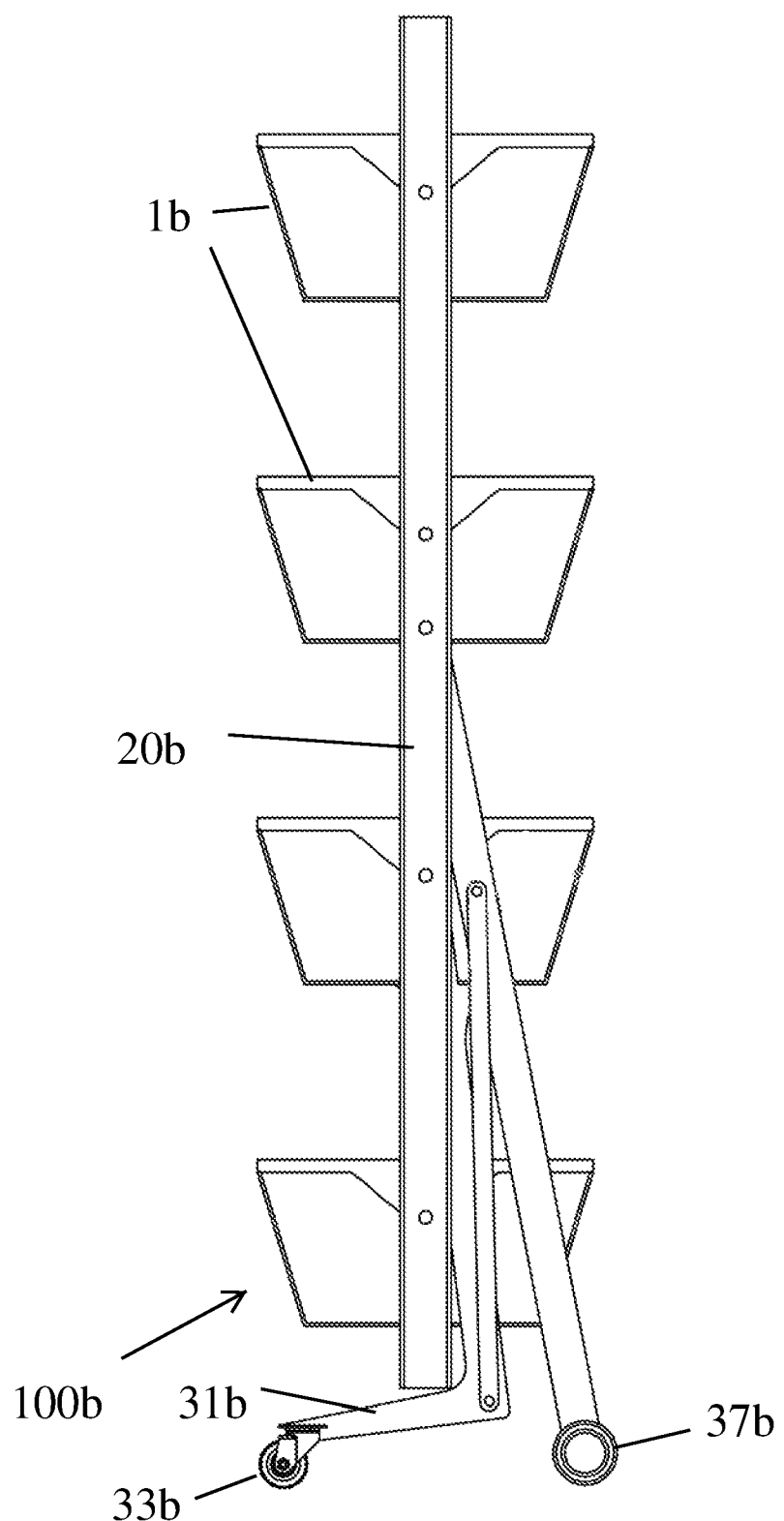
FIG. 5 shows in side elevation a convertible table and shelves having an anti-tip leg system, in a vertical shelf configuration, according to an embodiment of the present invention.
Figure 6:
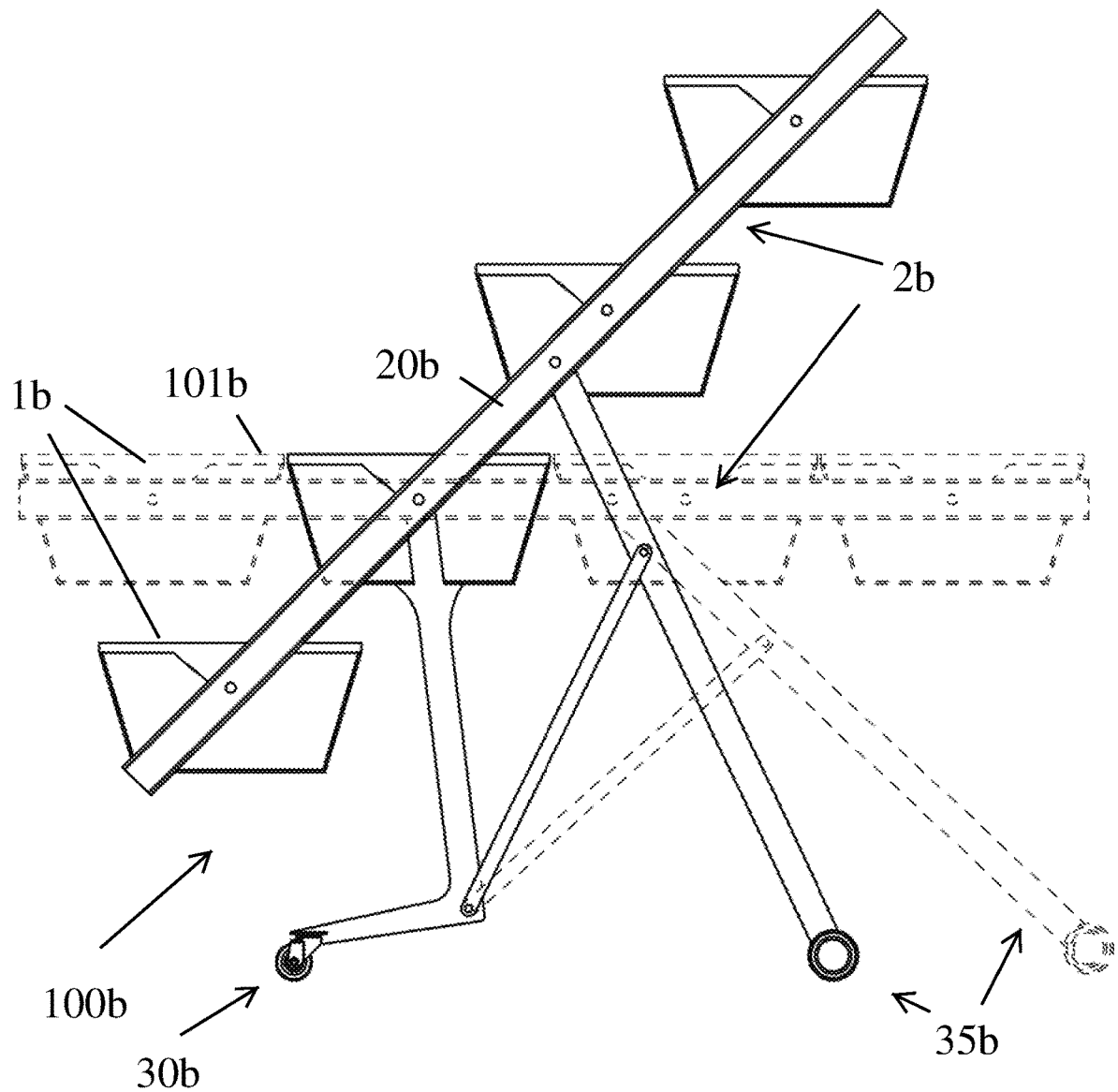
FIG. 6 shows in side elevation the convertible table and shelves of FIG. 5, but being transitioned between the shelf and substantially horizontal surface (shown in broken lines) configurations.
Figure 7:
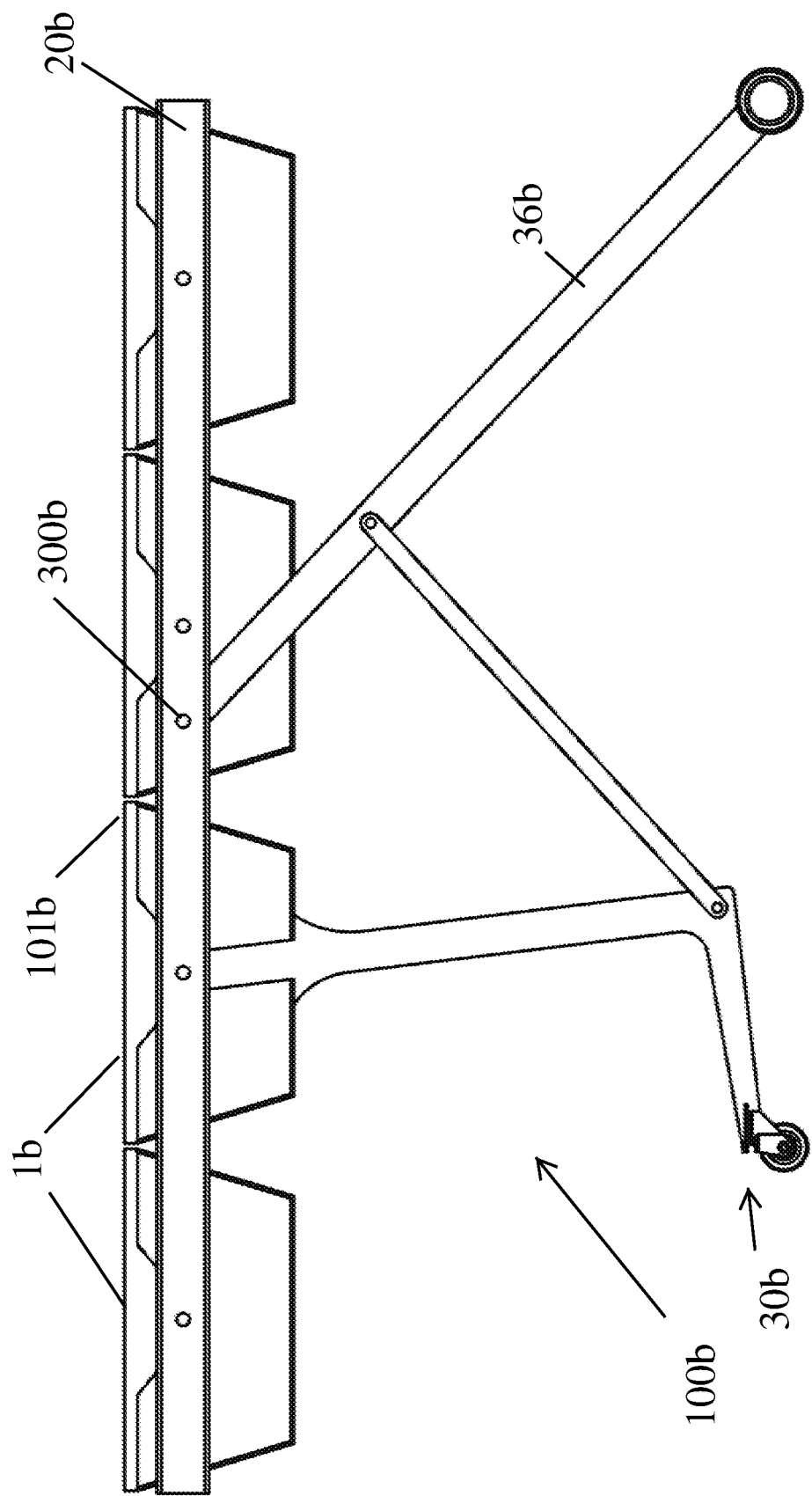
FIG. 7 shows in side elevation the convertible table and shelves of FIG. 5, but in the substantially horizontal surface configuration.

Referring now to FIGS. 5 to 7, there is shown a convertible item 100b in the form of a convertible table and shelves 100b that is configurable either as a table having a table top 101b (ie. substantially horizontal surface configuration) as seen in FIGS. 6 and 7, or shelves as seen in FIG. 5. Item 100b is essentially the same as item 100a. However, frame member 20b is shown in solid form, and the point of connection 300b of an upwardly extending leg 36b to a frame member 20b is shown. This item 100b also lacks a shock absorber.

It is to be understood that items 100a and 100b can utilise a different type of drive system as described herein, yet the anti-tip leg system 3a, 3b would operate in the same way. The drive 2a, 2b could be, for example, a worm gear, bevel gear, rack and pinion, motor, or sprocket and chain or belt drive.

Advantages of these embodiments (items 100a and 101b) include:

The anti-tip leg system 3a,b ensures that the convertible item 101a,b is always balanced when moving between the two configurations.

As the shelf units 1a,b move towards the substantially horizontal surface configuration, a spacing between the front and rear leg assemblies 30a,b, 35a,b widens so as to support the weight of the convertible item 100a,b and to prevent tipping over.

In the shelf configuration, the spacing between the front and rear leg assemblies 30a,b 35a,b narrows and the leg assemblies 30a,b, 35a,b have a small footprint.

The angle of the upwardly extending leg 31a,b of the front leg assembly 30a stays constant, so a rotating/variable direction castor wheel 33a,b can be used on that leg 31a,b.

The wheels 33a,b, 37a,b of the leg assemblies 30a,b, 35a,b are always adequately spaced from the centre of gravity.

The leg assemblies 30a,b, 35a,b are always in contact with the ground surface.

Each embodiment can be used as a free-standing table, display table, set of shelves or storage rack (eg. leaves in the form of baskets or trays).

Figure 8:
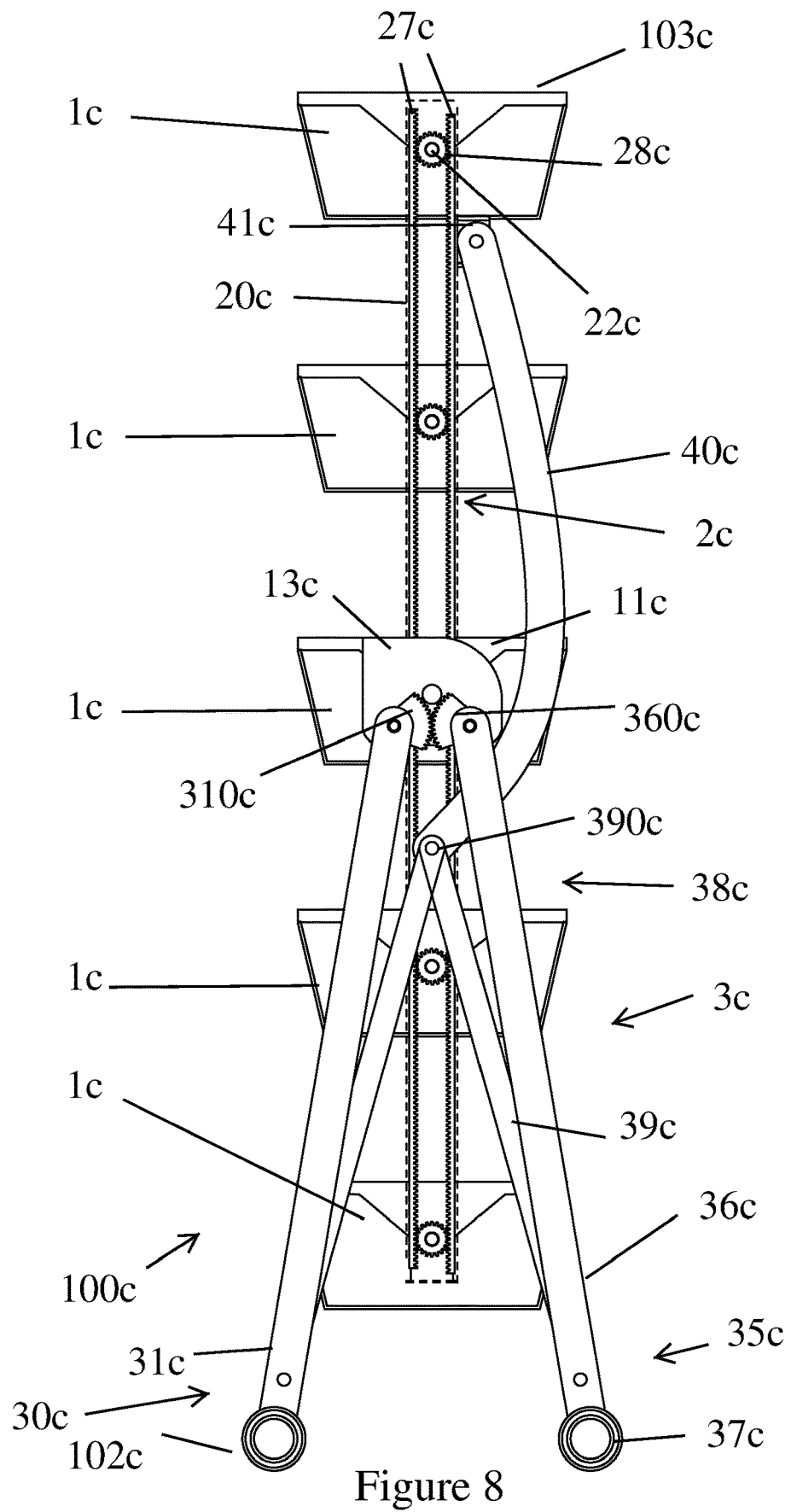
FIG. 8 shows in detailed side elevation a convertible table and shelves having an anti-tip leg system, in a vertical shelf configuration, according to an embodiment of the present invention.
Figure 9:
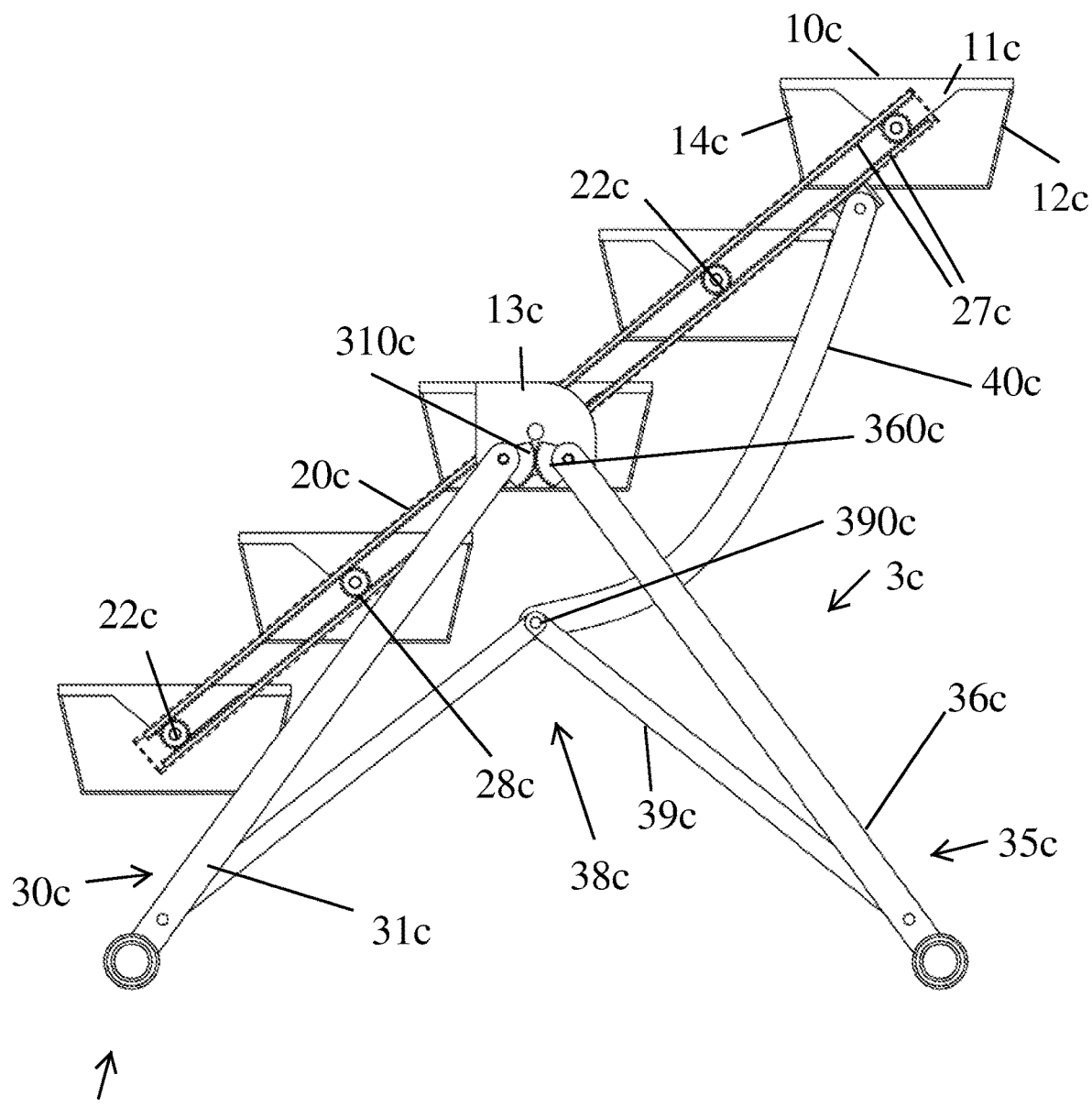
FIG. 9 shows in detailed side elevation the convertible table and shelves of FIG. 8, but being transitioned between the vertical shelf and substantially horizontal surface configurations.
Figure 10:
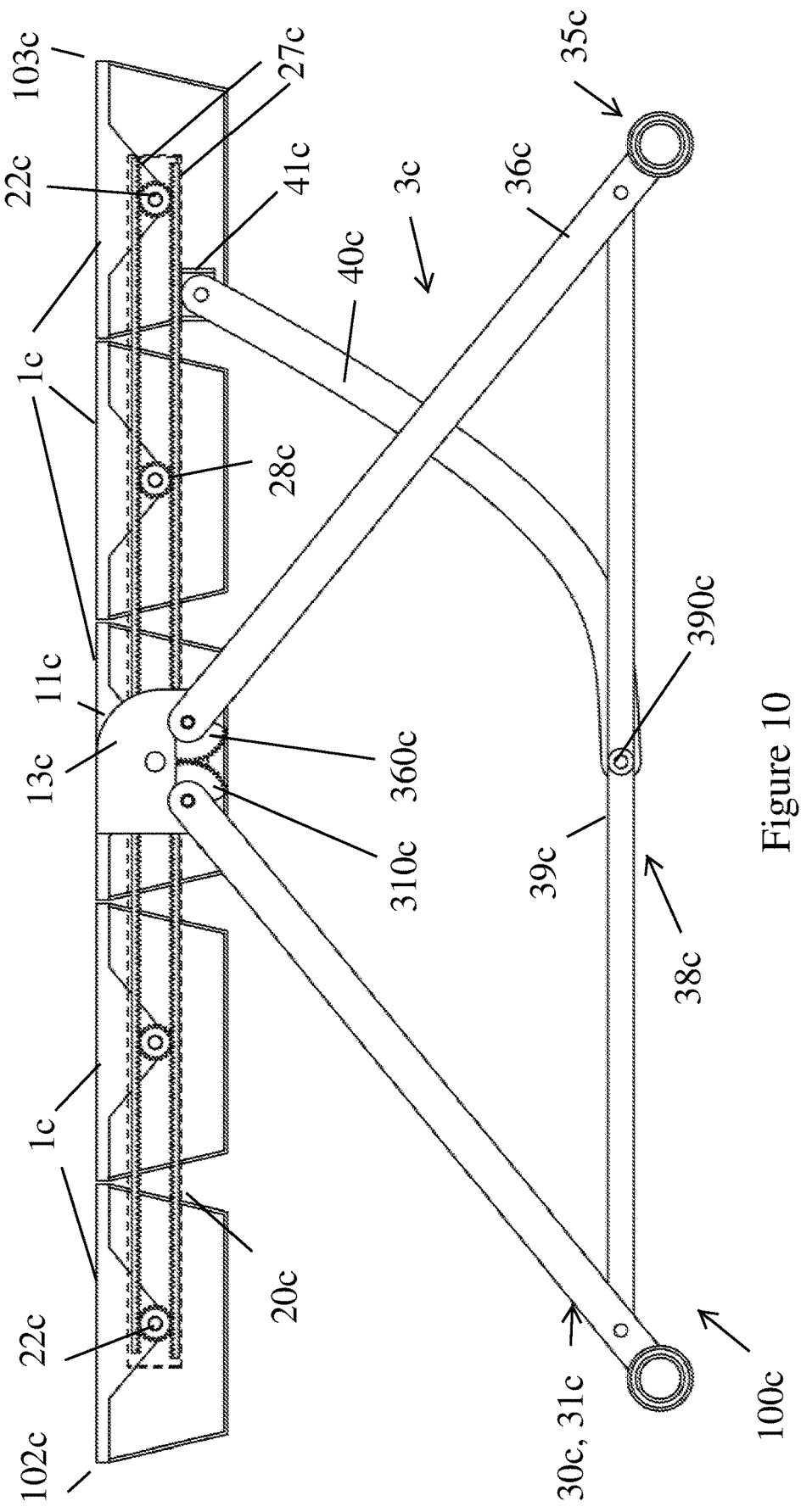
FIG. 10 shows in detailed side elevation the convertible table and shelves of FIG. 8, but in the substantially horizontal surface configuration.
Figure 11:
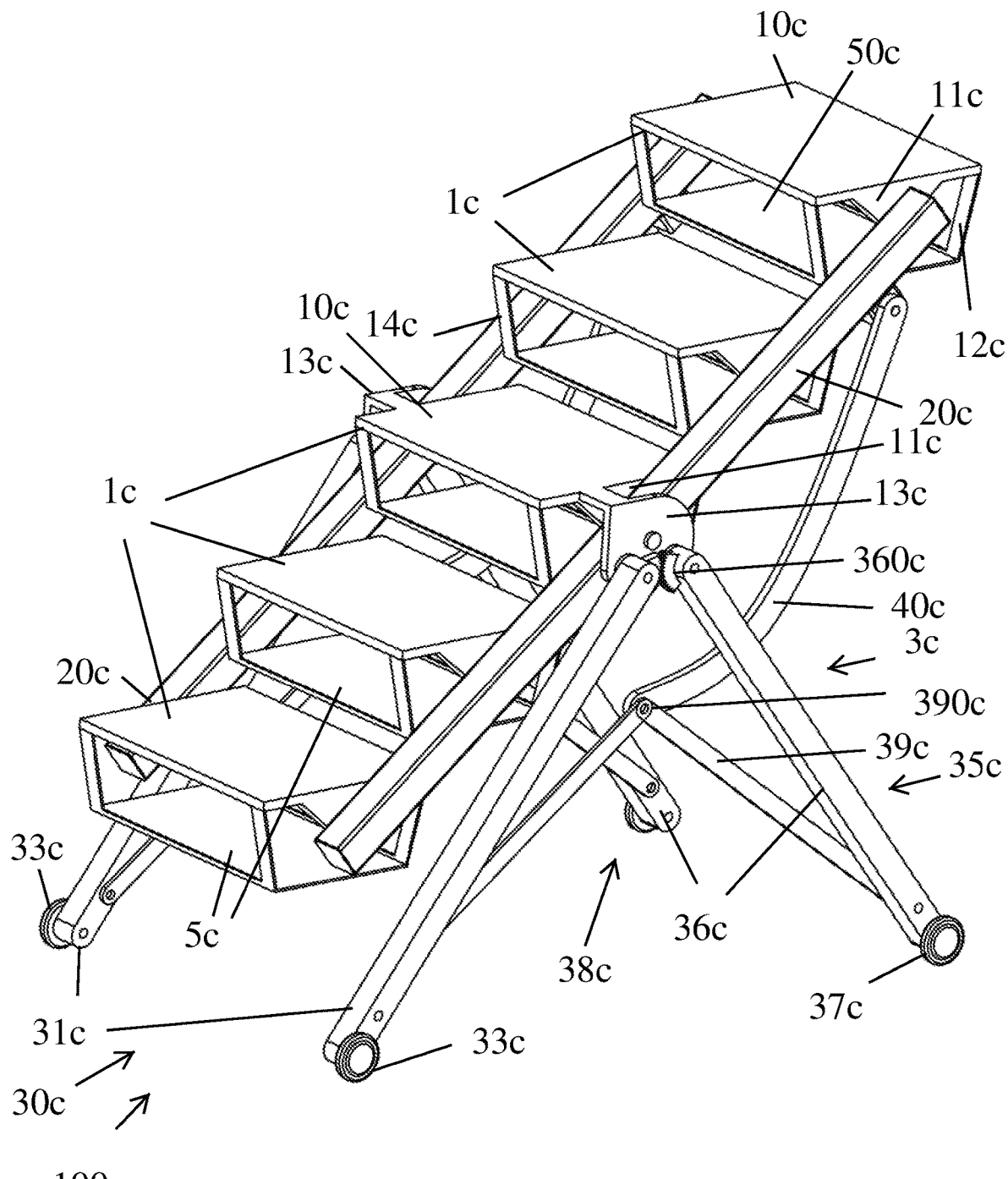
FIG. 11 is a side perspective view of the convertible table and shelves shown in FIG. 9.

Referring now to FIGS. 8 to 11, there is shown a convertible item 100c in the form of a convertible table and shelves that is configurable either as a table having a table top (ie. substantially horizontal surface configuration) as seen in FIG. 10 or shelves as seen in FIG. 8. In the substantially horizontal surface configuration, the convertible item 100c has a first/front end 102c and a second end/rear end 103c opposite the first end 102c. In the shelf configuration, the convertible item 100c has a lower end 102c and an upper end 103c opposite the lower end 102b.

The convertible table and shelves 101c includes first, second, third, fourth and fifth shelf units 1c, a drive system 2c operably connected to each shelf unit 1c, and an anti-tip leg system 3c for supporting the shelf units 1c and drive system 2c when moving between the two configurations.

Each shelf unit 1c comprises a substantially horizontally extending leave 10c and a leave support including a pair of spaced apart (partial) side walls 11c, (partial) rear wall 12c and (partial) front wall 14c, almost as described for the earlier embodiments.

The middle shelf unit 1c, however, has a further leave support connected to the leave 10c whereby an additional pair of side walls 13c extend parallel with the other side walls 11c. Frame members 20c of the mounting frame extend between the side walls 11c and 13c. Each leave support has a shaft-receiving aperture.

Each shelf unit 1c has a secondary shelf 5c located beneath the main leave 10c, almost as described for the earlier embodiments.

The shelf units 1c are wooden panels or boards (in some embodiments laminated) fastened together with mechanical fasteners such as screws and optionally non-mechanical fasteners such as adhesive.

Each secondary shelf 5c includes a substantially horizontally extending secondary leave 50c, a pair of spaced apart (partial) secondary side walls, rear wall and front wall as described for the earlier embodiments.

The drive system 2c is connected to each leave support such that the leaves 10c are able to pivot in unison and parallel with each other between (1) a shelf configuration whereby the leaves 10c extend in spaced substantially horizontal parallel planes above one another (see FIG. 8), and (2) a substantially horizontal surface configuration whereby the leaves 10c are positioned next to one another to form a substantially horizontal surface (see FIG. 10).

The drive system 2c comprises a mounting frame comprising a pair of hollow frame members 20c having channels, a plurality of shafts 22c, each having a working region located within a channel and another end secured within the opening of the leave support side wall 11c, and a drive in the form of a pair of racks 27c located within each of the frame members 20c that engage the working regions of the shafts 22c. Each working region is in the form of a pinion 28c that meshes with and between the racks 27c. As the shaft/pinion turns 22c, 28c, the racks 27c slide back and forth within the frame members 20c.

The anti-tip leg system 3c includes a front leg assembly 30c. The front leg assembly 30c includes an upwardly extending pair of legs 31c, each having an upper region pivotally connected to the leave support/side wall 13c, and a lower region supporting a wheel 33c (roller, castor etc.). The upwardly extending legs 31c extend generally parallel with each other, alongside the shelf unit 1c and respective frame member 20c. Each upwardly extending leg 31c is linear and extends towards the first/front end 102c and generally in a parallel plane with the frame member 20c.

The anti-tip leg system 3c includes a rear leg assembly 35c connected to a frame members 20c of the drive system 2c. The rear leg assembly 35c includes an upwardly extending pair of legs 36c, each having an upper region pivotally connected to the leave support/side wall 13c, and a lower region supporting a wheel 37c (roller, castor etc.). The upwardly extending legs 36cb extend parallel with each other, alongside a shelf unit 1c and respective frame member 20c. Each upwardly extending leg 36c is straight/linear and extends at an angle (relative to vertical) towards the rear end 103c.

The upwardly extending legs 31c, 36c are elongate tubular members. Each upper region of each upwardly extending leg includes meshed gears or teeth 310c, 360b that are pivotally connected using a pin to a leave support/side wall 13c.

The anti-tip leg system 3c includes a linkage assembly 38c extending between the upwardly extending leg 31c, 36c of each of the front and rear leg assemblies 30c, 35c. The linkage assembly 38c includes a hinged brace 39c comprising a central hinge region 390c, a first end pivotally connected to the upwardly extending leg 31c of the front leg assembly 30c and a second end pivotally connected to the upwardly extending leg 36c of the rear leg assembly 35c. A first hinged brace 39c is connected to a first pair of upwardly extending legs 31c, 36c, and a second hinged brace 39c is connected to a second pair of upwardly extending legs 31c, 36c.

When moving to the shelf configuration, the lower regions of the upwardly extending legs 31c, 36c move towards each other and the hinge region 390c enables the hinged brace 39c to fold upwardly. When moving to the substantially horizontal surface configuration, the lower regions of the upwardly extending legs 31c, 36c move away from each other to a maximum spacing dictated by the length of the hinged braces 39c, and the hinged braces 39c unfold and extend substantially horizontally.

The linkage assembly 38c further includes an arcuate riser 40c extending from the central hinge region 390c of the hinged brace 39c to a bracket 41c of each frame member 20c. A riser 40c extends from each hinged brace 39c to a respective bracket 41c. The riser 40c has an upper end and a lower end 41b. The lower end is pivotally connected to the central hinge region 390c of the hinged brace 39c, and the upper end is pivotally connected to the bracket 41c. When moving from the vertical shelf configuration to the substantially horizontal surface configuration, movement of the frame members 20c towards the horizontal causes the riser 40c to push down against the central hinge region 390c so that the hinged brace 39c is caused to straighten, which in turn causes the lower regions of the upwardly extending legs 31c, 36c to move apart. The meshed gears or teeth 310c, 360c that are pivotally connected to the leave support/side wall 13c ensure that the upwardly extending legs 31c, 36c move apart in a coordinated manner. When moving from the substantially horizontal surface configuration to the vertical shelf configuration, the mounting frame moves from the horizontal, causing the riser 40c to pull on the central hinge region 390c and therefore causing the lower regions of the upwardly extending legs 31c, 36c to move towards each other. Again, the meshed gears or teeth 310c, 360c that are pivotally connected to the leave support/side wall 13c ensure that the upwardly extending legs 31c, 36c move together in the required manner.

Figure 12:
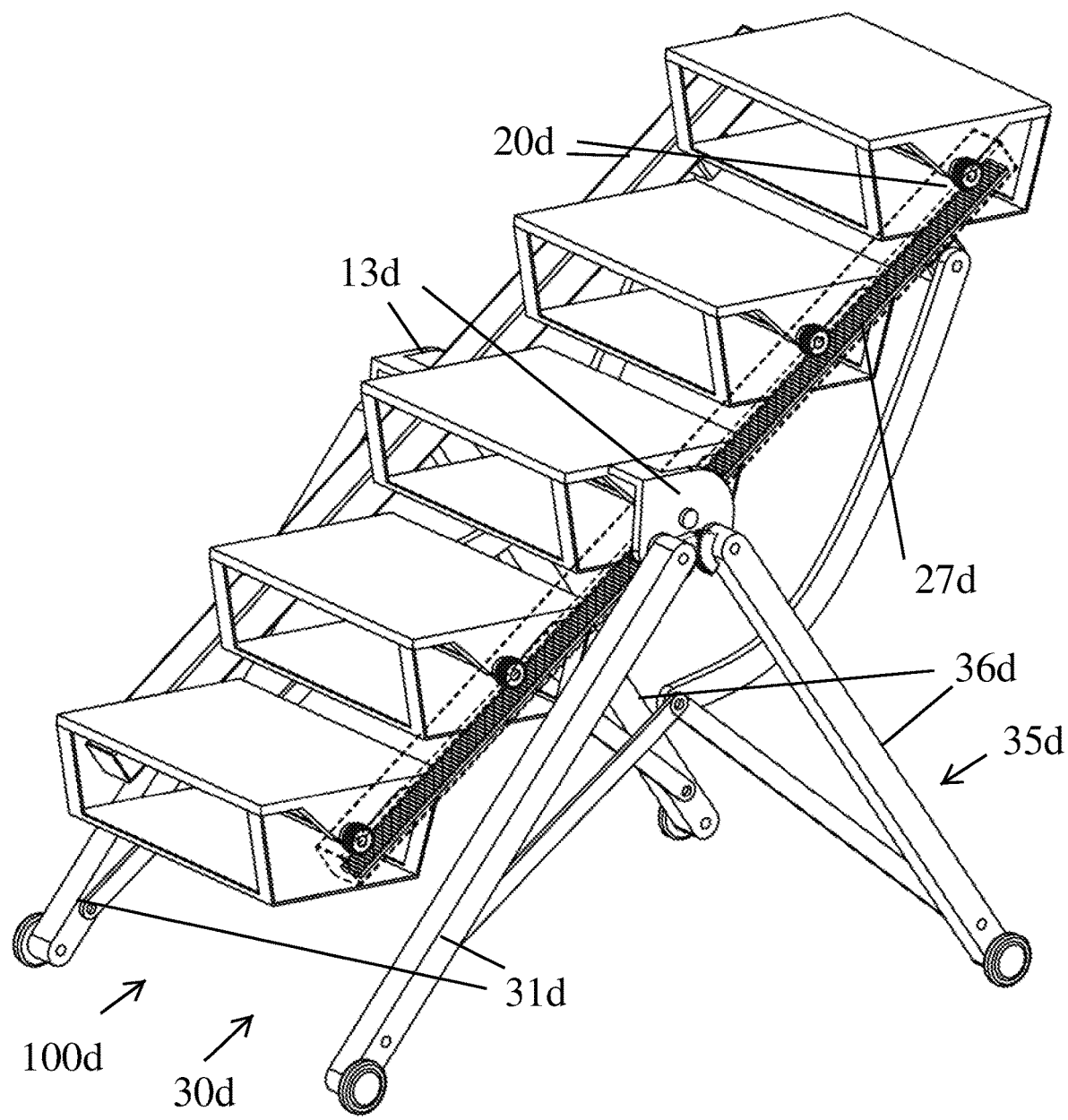
FIG. 12 is a detailed side perspective view a convertible table and shelves having an anti-tip leg system like that shown in FIG. 11 except that it has a different type of drive system, according to an embodiment of the present invention.

Referring now to FIG. 12, there is shown a convertible item 100d that is almost identical to item 101c, except that the drive system has a single rack 27d located with each frame member 20d.

Figure 13:
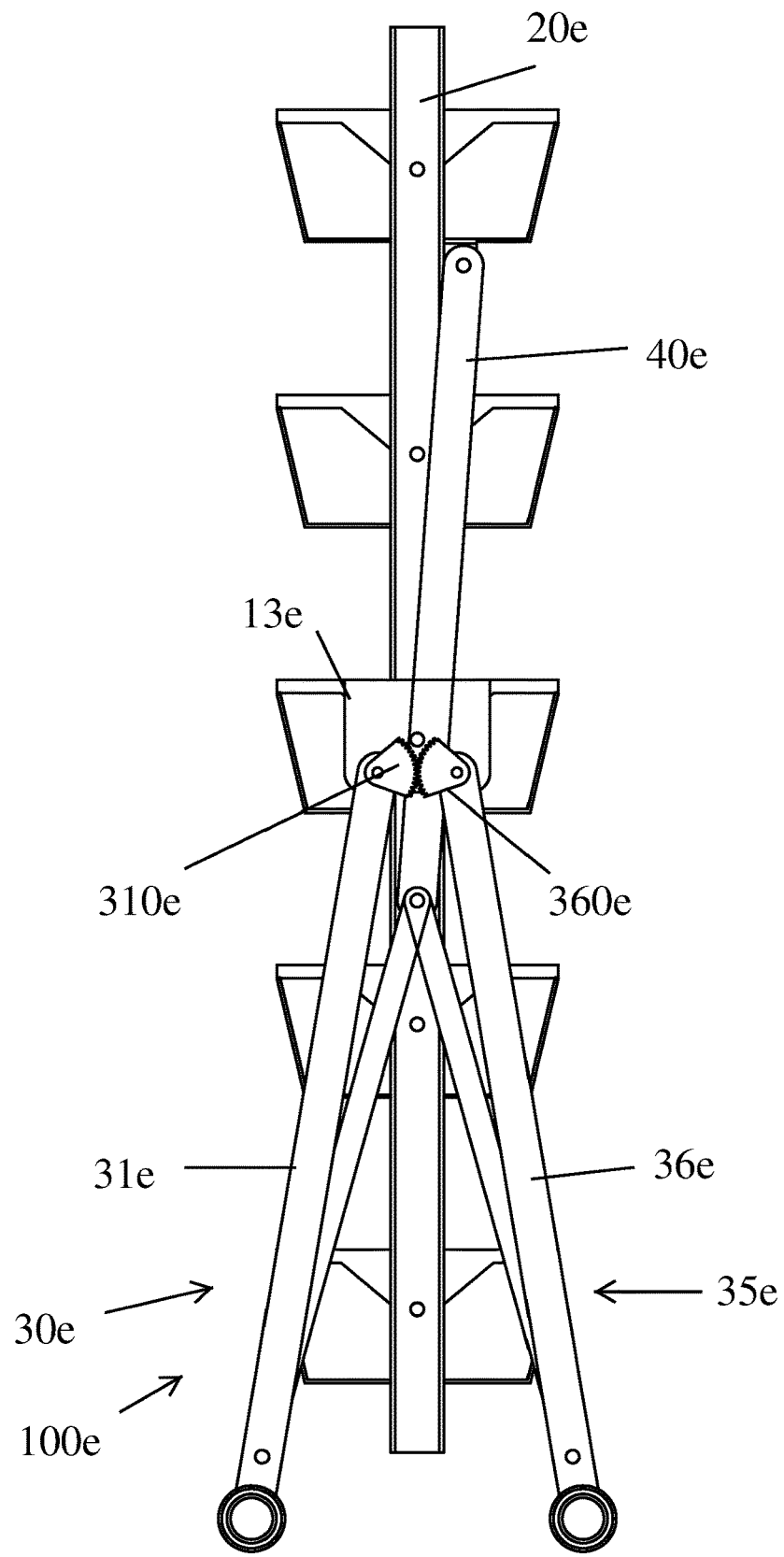
FIG. 13 shows in side elevation a convertible table and shelves having an anti-tip system, in a vertical shelf configuration, according to an embodiment of the present invention.
Figure 14:
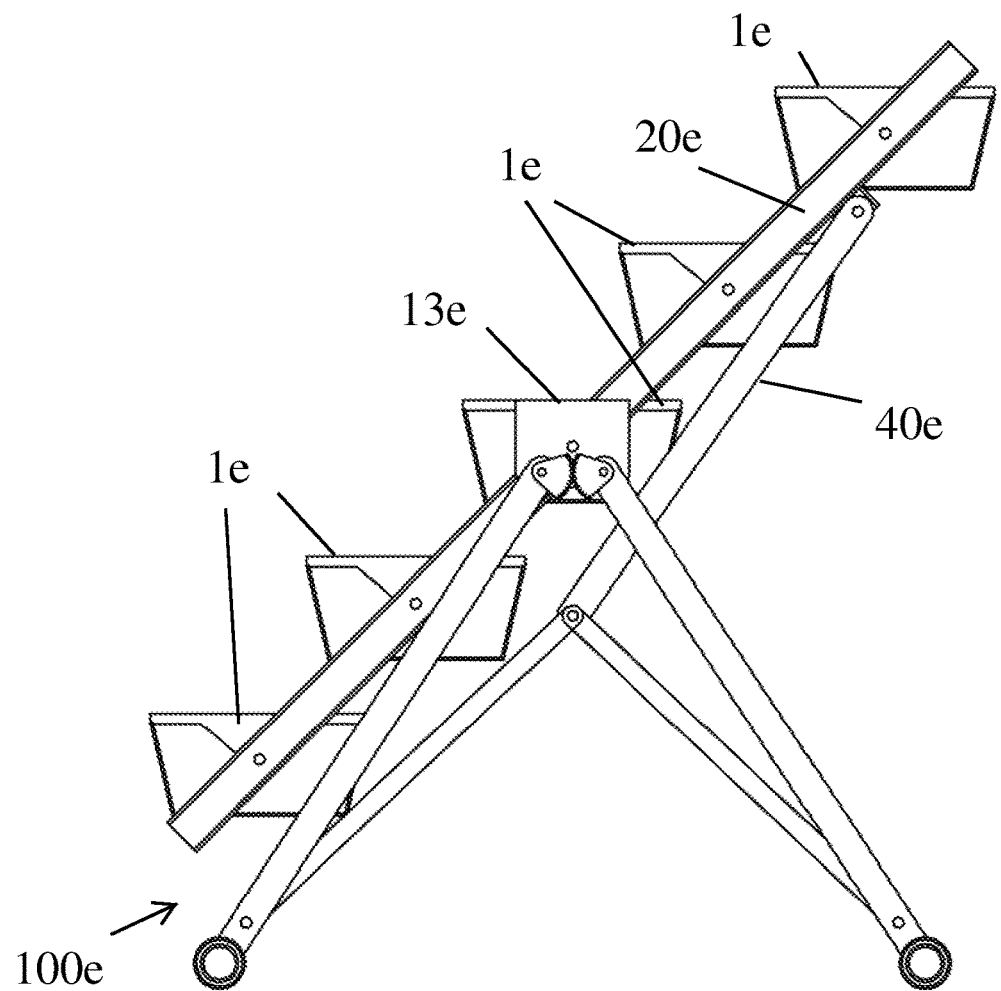
FIG. 14 shows in side elevation the convertible table and shelves of FIG. 13, but being transitioned between the vertical shelf and substantially horizontal surface configurations.
Figure 15:
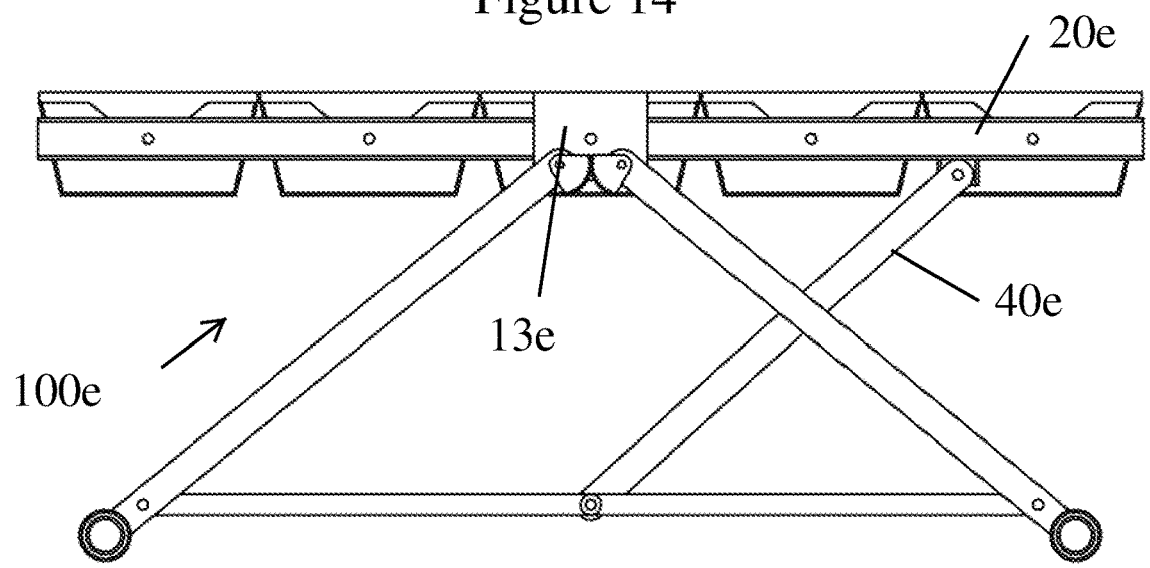
FIG. 15 shows in side elevation the convertible table and shelves of FIG. 13, but in the substantially horizontal surface configuration.
Figure 18:
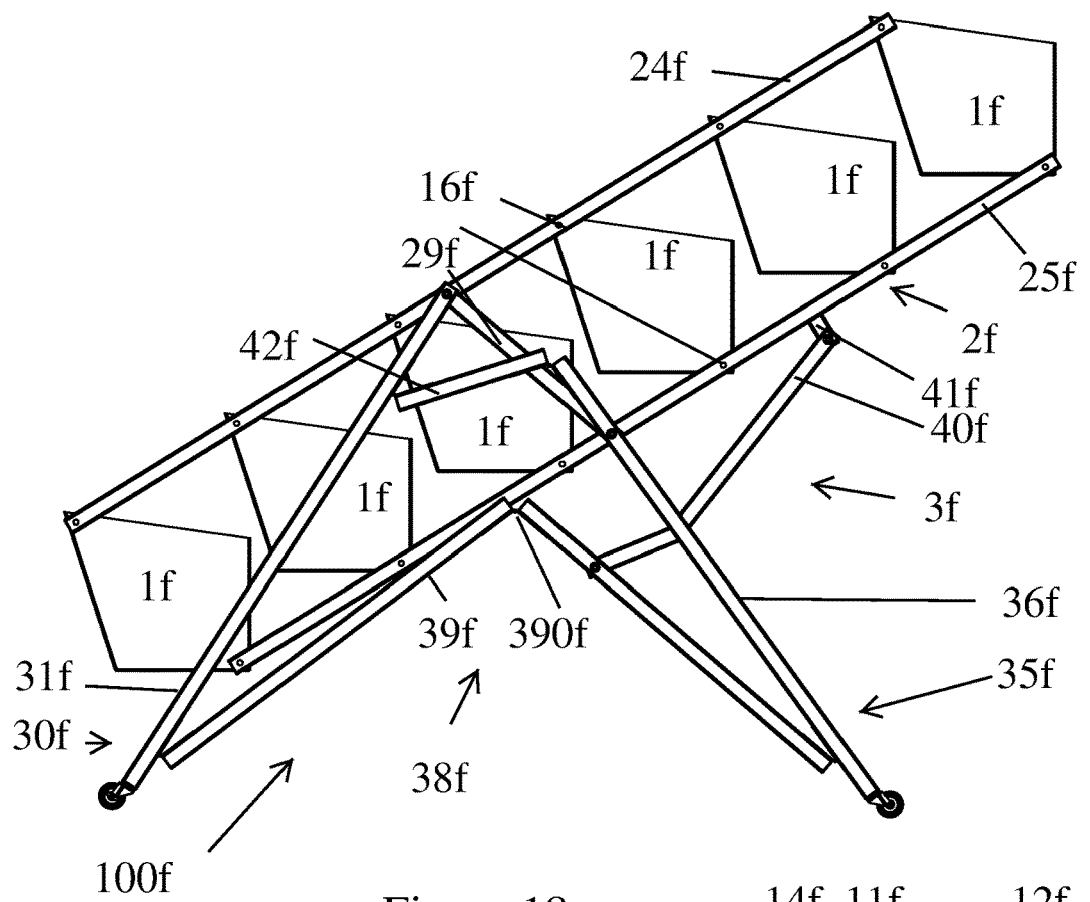
FIG. 18 shows in side elevation the convertible shelves of FIG. 16, but being transitioned between the vertical shelf and substantially horizontal shelf configurations.
Figure 19:
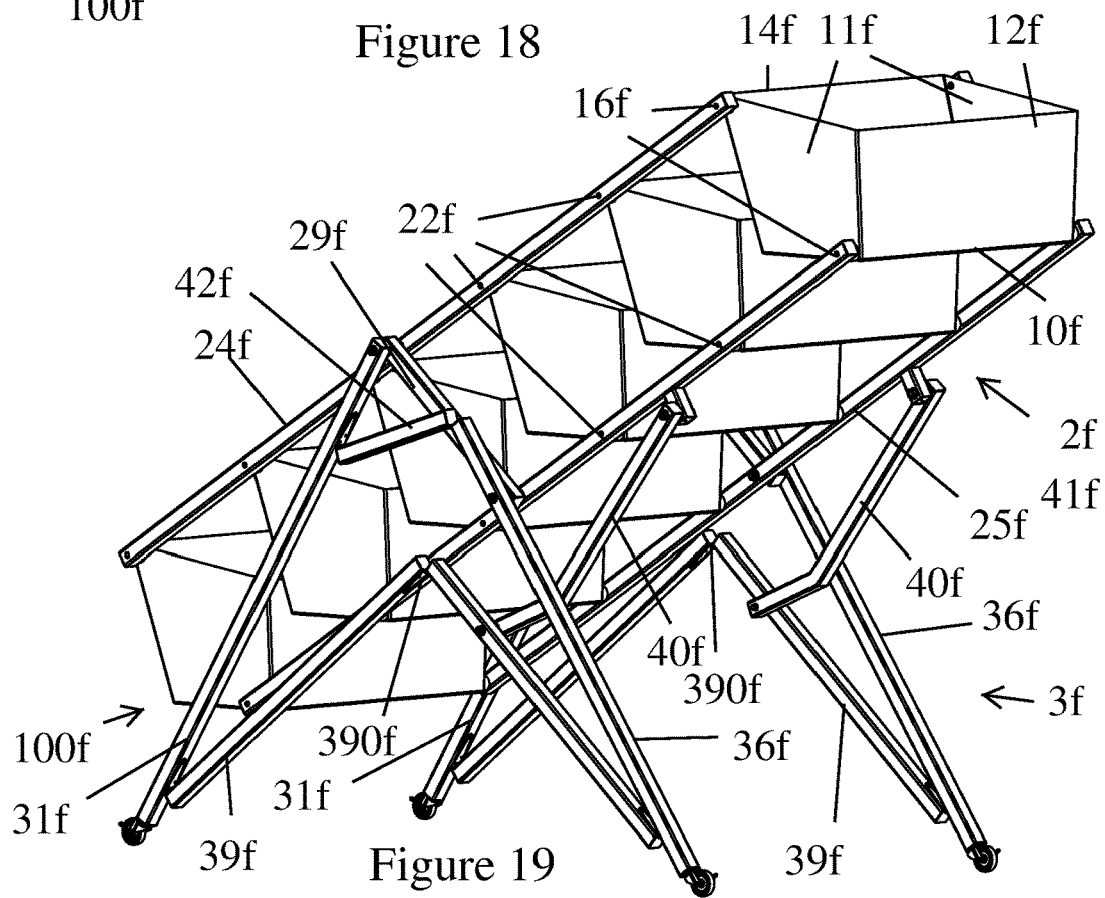
FIG. 19 shows the convertible shelves of FIG. 18 in perspective.

Referring now to FIGS. 13 to 15, there is shown a convertible item 100e that is almost identical to item 101c, except that the riser 40e is linear, the leave support/side wall 13e is of a slightly different shape, and frame members 20e are of differing length compared with that of item 101c.

The advantages of these embodiments include:
- The anti-tip leg system 3c-e ensures that the convertible item 101c-e is always balanced when moving between the two configurations.
- As the shelf units 1c-e move towards the substantially horizontal surface configuration, the spacing between the front and rear leg assemblies 30c-e, 35c-e widens so as to support the weight of the convertible item and to prevent tipping over.
- In the shelf configuration, the spacing between the front and rear leg assemblies narrows and the leg assemblies can have a small footprint.
- The legs 31c-e, 36c-e are symmetrical.
- The wheels of the leg assemblies 30c-e, 35c-e are always adequately spaced from the centre of gravity.
- The pivot point is at the centre of the table.
- The meshed gears or teeth 310c-e, 360c-e ensure that the upwardly extending legs 31c-e, 36c-e move together and apart in the required manner.
- Each of these embodiments can be used as a free-standing table, display table, set of shelves or storage rack (eg. leaves in the form of open-ended containers or baskets).

Figure 20:
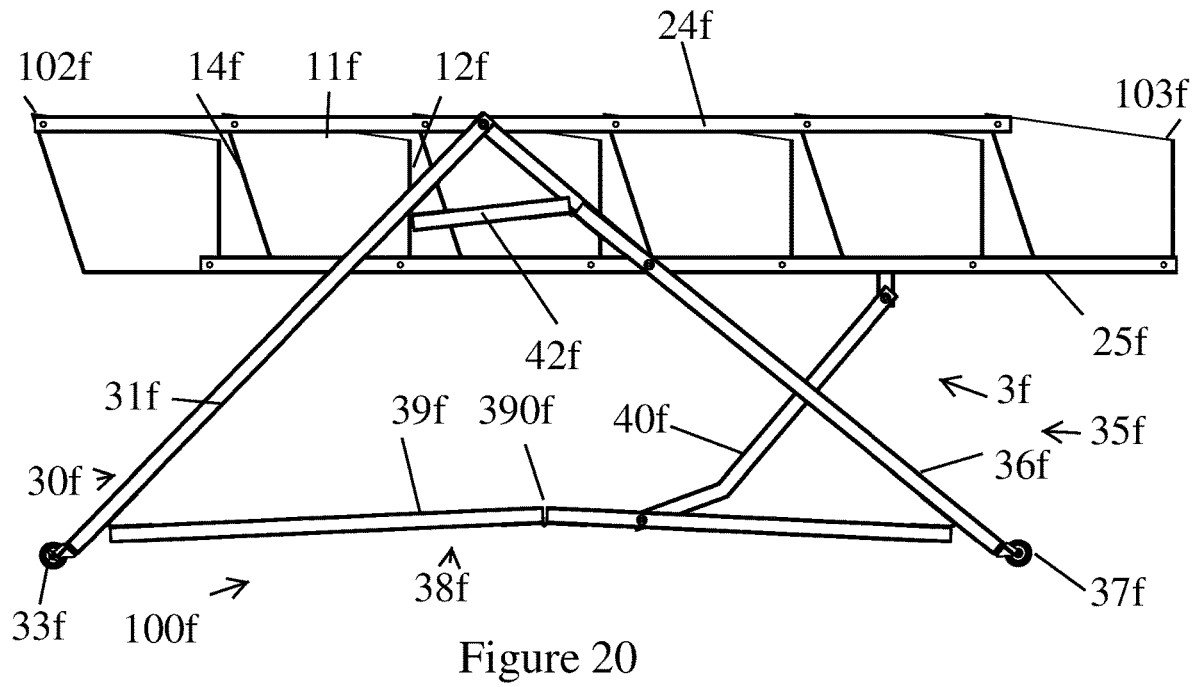
FIG. 20 shows in side elevation the convertible shelves having an anti-tip leg system, in a substantially horizontal shelf configuration.
Figure 21:
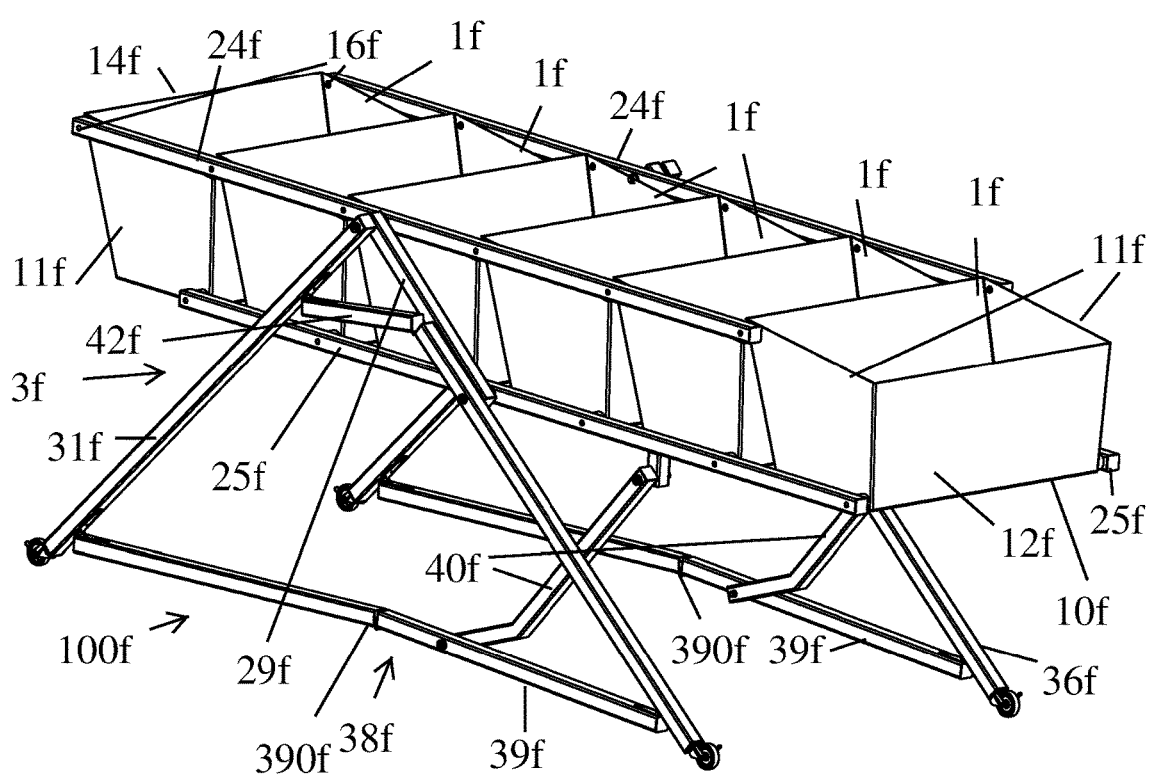
FIG. 21 shows the convertible shelves of FIG. 20 in perspective.

Referring now to FIGS. 16 to 21, there is shown a convertible item 100f in the form of convertible shelves 100f that is configurable either as a vertical set of shelves ('vertical configuration') as shown in FIGS. 16 and 17, or substantially horizontally extending shelves ('horizontal configuration') as seen in FIGS. 20 and 21. In the horizontal configuration, the convertible item 100f has a first/front end 102f and a second end/rear end 103f opposite the first end 102f. In the shelf configuration, the convertible item 100f has a lower end 102f and an upper end 103f opposite the lower end 102f. The convertible item 101f has a centre point located midway between the front 102f and rear ends 103f.

The item 101f includes first, second, third, fourth, fifth and sixth shelf units 1f, a drive system 2f operably connected to each shelf unit 1f, and an anti-tip leg system 3f for supporting the shelf units 1f and drive system 2f when moving between the two configurations.

Each shelf unit 1f comprises a substantially horizontally extending leave 10f and a leave support including a pair of spaced apart side walls 11f extending upwardly from the leave 10f, a rear wall 12f extending between the leave 10f and the side walls 11f, and a front wall 14f extending between the leave 10f and the side walls 11f. Each shelf unit if is in the form of an open-ended container/basket. Each leave support side wall 11f has a pair of shaft-receiving apertures 16f.

The drive system 2f is connected to each leave support such that the leaves 10f are able to pivot in unison and parallel with each other between (1) a vertical shelf configuration whereby the leaves 10f extend in spaced substantially horizontal parallel planes above one another (see FIG. 17), and (2) a substantially horizontal configuration whereby the leaves 10f are positioned next to one another (see FIG. 21).

The drive system 2f comprises a plurality of shafts 22f, each having a working end and another end secured to a leave support side wall 11f. The drive system 2f includes a drive in the form of rigid linkage bar member pairs 24f, 25f. The linkage bar members 24f, 25f extend parallel with each other at all times. Each rigid linkage bar member 24f, 25f is connected to the working region of a shaft 22f extending through a respective opening in the member 24f, 25f. The parallel-extending rigid linkage bar members 24f, 25f move all of the leaves supports in unison, to ensure that all shelf units if rotate in unison. As bar member 24f moves in one direction, the other bar member 25f moves in the opposite but parallel direction.

The drive system 2f comprises a mounting frame in the form of stabilising crosspieces 29f, each of which connects one bar member 24f to the other 25f. The ends of each crosspiece 29f are pivotally connected to the bar members 24f, 25f by way of pivot pins.

The anti-tip leg system 3f includes a front leg assembly 30f. The front leg assembly 30f includes an upwardly extending pair of legs 31f, each having an upper region connected to a stabilising crosspiece 29f and bar member 24f by way of pivot pins, and a lower region supporting a wheel (roller, castor etc.) 33f. The upwardly extending legs 31f extend generally parallel with each other, alongside the shelf unit 1f. Each upwardly extending leg 31f is linear and extends towards the first/front end 102f and generally in a parallel plane with bar member 24f.

The anti-tip leg system 3f includes a rear leg assembly 35f. The rear leg assembly 35f includes an upwardly extending pair of legs 36f, each having an upper region connected to a stabilising crosspieces 29f and bar member 25f, and a lower region supporting a wheel (roller, castor etc.) 37f. The upwardly extending legs 36f extend parallel with each other, alongside a shelf unit 1f. Each upwardly extending leg 36f is straight/linear and extends at an angle (relative to vertical) towards the rear end 103f. The upwardly extending legs 31f, 36f are elongate tubular members.

The anti-tip leg system 3f includes a linkage assembly 38f extending between the upwardly extending leg 31f, 36f of each of the front and rear leg assemblies 30f, 35f. The linkage assembly 38f includes a hinged brace 39f comprising a central hinge region 390f, a first end pivotally connected to the upwardly extending leg 31f of the front leg assembly 30f and a second end pivotally connected to the upwardly extending leg 36f of the rear leg assembly 35f. A first hinged brace 39f is connected to a first pair of upwardly extending legs 31f, 36f, and a second hinged brace 39f is connected to a second pair of upwardly extending legs 31f, 36f.

The linkage assembly 38f further includes a brace 42f having a first end pivotally connected to the upwardly extending leg 31f of the front leg assembly 30f and a second end pivotally connected to the upwardly extending leg 36f of the rear leg assembly 35f. A first brace 42f is connected to a first pair of upwardly extending legs 31f, 36f, and a second brace 42f is connected to a second pair of upwardly extending legs 31f, 36f.

When moving to the vertical configuration, the lower region of the upwardly extending legs 31f, 36f move towards each other and the hinge region 390f enables the hinged brace 39f to fold upwardly. When moving to the substantially horizontal surface configuration, the lower region of the upwardly extending legs 31f, 36f move away from each other to a maximum spacing dictated by the length of each hinged brace 39f, and each hinged brace 39f unfolds and extends substantially horizontally.

The linkage assembly 38f further includes a non-linear (bent) riser 40f extending from the hinged brace 39f to a bracket 41f of each bar member 25f. A riser 40f extends from each hinged brace 39f to a respective bracket 41f. The riser 40f has an upper end and a lower end. The lower end is pivotally connected to the hinged brace 39f, and the upper end is pivotally connected to the bracket 41f. When moving from the vertical shelf configuration to the horizontal configuration, movement of the bar member 25f towards the horizontal causes the riser 40f to push down against the hinged brace 39f so that the hinged brace 39f is caused to straighten, which in turn causes the lower regions of the upwardly extending legs 31f, 36f to move apart. When moving from the horizontal configuration to the shelf configuration, the bar member 25f moves from the horizontal, causing the riser 40f to pull on the hinged brace 39f and therefore causing the lower regions of the upwardly extending legs 31f, 36f to move towards each other.

The advantages of this embodiment include:

The anti-tip leg system 3f ensures that the convertible item 101f is always balanced when moving between the two configurations.

As the shelf units if move towards the horizontal configuration, the spacing between the front and rear leg assemblies 30f, 35f widens so as to support the weight of the convertible item 101f and to prevent tipping over.

In the shelf configuration, the spacing between the front and rear leg assemblies 30f, 35f narrows and the leg assemblies can have a small footprint.

The wheels 33f, 37f of the leg assemblies 30f, 35f are always adequately spaced from the centre of gravity.

In the present specification and claims, the word 'comprising' and its derivatives including 'comprises' and 'comprise' include each of the stated integers but does not exclude the inclusion of one or more further integers.

Reference throughout this specification to 'one embodiment' or 'an embodiment' means that a particular feature, structure, or characteristic described in connection with the embodiment is included in at least one embodiment of the present invention. Thus, the appearance of the phrases 'in one embodiment' or 'in an embodiment' in various places throughout this specification are not necessarily all referring to the same embodiment. Furthermore, the particular features, structures, or characteristics may be combined in any suitable manner in one or more combinations.

In compliance with the statute, the invention has been described in language more or less specific to structural or methodical features. It is to be understood that the invention is not limited to specific features shown or described since the means herein described comprises preferred forms of putting the invention into effect. The invention is, therefore, claimed in any of its forms or modifications within the proper scope of the appended claims appropriately interpreted by those skilled in the art.

The invention claimed is:

1. A convertible item, comprising:
   a front end and a rear end;
   a plurality of shelf units, wherein each said shelf unit comprises a substantially horizontally extending leave and at least one leave support for supporting the leave;
   a drive system operably connected to each said leave support such that the leaves remain substantially horizontal when the shelf units are moved between (1) a substantially vertical shelf configuration whereby the leaves extend in spaced substantially horizontal parallel planes above one another, and (2) a substantially horizontal configuration whereby the leaves are positioned next to one another in a substantially horizontal plane between the front and rear ends; and
   an anti-tip leg system comprising:
      a front leg assembly comprising at least an upwardly extending pair of front legs spaced apart from one another, each said front leg comprising a front leg upper region operably connected directly or indirectly to a shelf unit or a part of the drive system and a front leg lower region supporting at least one wheel;
      a rear leg assembly comprising at least an upwardly extending pair of rear legs spaced apart from one another, each said rear leg comprising a rear leg upper region operably connected directly or indirectly to a said shelf unit or a part of the drive system, and a rear leg lower region supporting at least one wheel; and
      a linkage assembly interconnecting the front and rear leg assemblies,
   wherein:
      a spacing between the front and rear leg lower regions increases as the shelf units move towards the substantially horizontal configuration;
      the spacing between the front and rear leg lower regions decreases as the shelf units move towards the substantially vertical shelf configuration;
      said front and rear leg lower regions remain in contact with a ground surface at all times; and
      said linkage assembly determines a maximum spacing allowable between the front and rear legs.

2. The convertible item of claim 1, wherein each of the front legs and each of the rear legs is positioned alongside the shelf units.

3. The convertible item of claim 1, wherein one of said shelf units is a mounting shelf unit and wherein each said front leg upper region is fixedly connected to the mounting shelf unit such that the leave of the mounting shelf unit is unable to pivot relative to the front legs.

4. The convertible item of claim 1, wherein each said rear leg upper region is pivotally connected to a said part of the drive system such that the leave of each said shelf unit is able to pivot relative to the rear legs.

5. The convertible item of claim 4, wherein said part of the drive system is a mounting frame which extends along both sides of each said shelf unit, and each said rear leg upper region is pivotally connected to the mounting frame.

6. The convertible item of claim 5, wherein the mounting frame houses a drive of the drive system.

7. The convertible item of claim 6, wherein the drive system comprises a respective shaft connected to each said leave support, each said shaft comprises a working region that is located within the mounting frame, and the drive is connected to the working regions such that the shafts are rotatable in unison.

8. The convertible item of claim 1, wherein the linkage system comprises at least one brace comprising a first end pivotally connected to a said front leg and a second end pivotally connected to a said rear leg.

9. The convertible item of claim 8, wherein the linkage system comprises two said braces pivotally connecting the front legs to the rear legs.

10. The convertible item of claim 1, wherein each of the front legs comprises an about 90° bend such that the lower region of each front leg below the bend extends towards the front end and the upper region of each said front leg above the bend also extends upwardly towards the front end.

11. The convertible item of claim 1, wherein each of the rear legs is straight.

12. The convertible item of claim 1, wherein each of the rear legs extends downwardly towards the rear end.

13. The convertible item of claim 1, wherein one of said shelf units is a mounting shelf unit and wherein each said front leg upper region is pivotally connected to the mounting shelf unit such that the leave of the mounting shelf unit is able to pivot relative to the front legs.

14. The convertible item of claim 13, wherein each said rear leg upper region is pivotally connected to the mounting shelf unit such that the leave of the mounting shelf unit is able to pivot relative to the rear legs.

15. The convertible item of claim 13, wherein the linkage system comprises at least one hinged brace comprising a first end pivotally connected to a said front leg, a second end pivotally connected to a said rear leg, and a hinge region between said first and second ends.

16. The convertible item of claim 15, wherein the linkage system comprises at least one riser comprising a first end pivotally connected to the hinge region and a second end pivotally connected to a part of the drive system at or near to the rear end such that the hinged brace can fold upwardly.

17. The convertible item of claim 16, wherein said part of the drive system is a mounting frame which extends along both sides of each said shelf unit, and said second end of the riser is pivotally connected to the mounting frame.

18. The convertible item of claim 17, wherein when moving from the horizontal configuration, the riser pulls on the hinged brace to cause the front and rear leg lower regions to move towards each other.

19. The convertible item of claim 16, wherein the linkage system comprises two said hinged braces pivotally connecting the front legs to the rear legs, and two said risers.

20. The convertible item of claim 1, wherein each said front leg upper region is pivotally connected to a part of the drive system such that the leave of the mounting shelf unit is able to pivot relative to the front legs.

* * * * *